United States Patent
Shinyama et al.

(10) Patent No.: US 6,548,210 B1
(45) Date of Patent: Apr. 15, 2003

(54) NICKEL ELECTRODES FOR ALKALINE SECONDARY BATTERY AND ALKALINE SECONDARY BATTERIES

(75) Inventors: Katsuhiko Shinyama, Higashiosaka (JP); Reizo Maeda, Moriguchi (JP); Yasuyuki Harada, Hirakata (JP); Tadayoshi Tanaka, Takatsuki (JP); Yoshinori Matsuura, Hirakata (JP); Toshiyuki Nohma, Hirakata (JP); Ikuo Yonezu, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/449,552

(22) Filed: Nov. 29, 1999

(30) Foreign Application Priority Data

Nov. 30, 1998 (JP) .......................... 10-340325
Mar. 19, 1999 (JP) .......................... 11-074702
Mar. 23, 1999 (JP) .......................... 11-077943
Jul. 6, 1999 (JP) .......................... 11-191844

(51) Int. Cl.$^7$ .................... H01M 4/32; H01M 4/80; H01M 2/16; B32B 15/01
(52) U.S. Cl. ..................... 429/223; 429/235; 429/236; 429/144; 428/615; 428/680
(58) Field of Search ................ 429/223, 218.1, 429/137, 136, 235, 236, 206, 231.6, 233, 142, 144; 428/615, 570, 680

(56) References Cited

U.S. PATENT DOCUMENTS

| 5,466,543 | A | 11/1995 | Ikoma et al. ................. 429/59 |
| 5,466,546 | A | 11/1995 | Pensabene et al. ......... 429/223 |
| 6,245,459 | B1 * | 6/2001 | Maruta et al. ............... 429/223 |
| 6,261,720 | B1 * | 7/2001 | Kimiya et al. .............. 429/223 |

FOREIGN PATENT DOCUMENTS

| JP | 59-163753 | 9/1984 |
| JP | 62-66569 | 3/1987 |
| JP | 5-89876 | 4/1993 |
| JP | 8-329937 | 12/1996 |
| JP | 9-265981 | 10/1997 |
| JP | 10-149821 | 6/1998 |

* cited by examiner

Primary Examiner—Patrick Ryan
Assistant Examiner—R Alejandro
(74) Attorney, Agent, or Firm—Armstrong, Westerman & Hattori, LLP

(57) ABSTRACT

A nickel electrode for alkaline secondary battery including a porous sintered nickel substrate loaded with a nickel hydroxide-based active material, the nickel electrode has a configuration wherein a surface portion of the active material loaded into the sintered nickel substrate is provided with a combination of a first coating layer of a suitable compound and a second coating layer of a suitable compound, or a coating layer of a compound of two or more suitable elements, or wherein the coating layer of two or more suitable elements is formed between the sintered nickel substrate and the active material.

18 Claims, 3 Drawing Sheets

NICKEL ELECTRODES FOR ALKALINE SECONDARY BATTERY AND ALKALINE SECONDARY BATTERIES

BACKGROUND OF THE INVENTION

1. Field of the Invention

The present invention relates to nickel electrodes for alkaline secondary battery wherein a porous sintered nickel substrate is loaded with a nickel hydroxide-based active material, and alkaline secondary batteries employing the same as the positive electrode therefor. The invention is directed to the improvement of the nickel electrode for alkaline secondary battery for suppression of self discharge associated with oxygen evolution during storage of the charged alkaline secondary battery under high temperature conditions and for increase in the high-current discharge capacity of the electrode.

2. Description of the Related Art

The conventional alkaline secondary batteries such as nickel-hydrogen secondary batteries, nickel-cadmium secondary batteries and the like, have employed sintered nickel electrodes or non-sintered nickel electrodes as the positive electrode therefor.

The non-sintered nickel electrode is fabricated by directly loading a nickel hydroxide-based active material paste into a porous conductive body, such as a nickel substrate foam. Although this electrode is easy to fabricate, there is a disadvantage of poor charge/discharge characteristics at high current.

On the other hand, the sintered nickel electrode employs a porous sintered nickel substrate obtained by sintering and is fabricated by chemically impregnating the porous sintered nickel substrate with a salt as the active material. The sintered nickel substrate presents higher conductivity. In addition, the electrode is excellent in the charge/discharge characteristics at high current because of good adhesion of the active material to the porous sintered nickel substrate. On this account, the alkaline secondary batteries with the sintered nickel electrodes are favorably used in electric power tools requiring high current discharge.

Unfortunately, the sintered nickel electrode has a lower loading ratio of the active material than the non-sintered nickel electrode and therefore, must be improved in the utilization of the active material therefor. In addition, repeated charges/discharges of the alkaline secondary battery with the sintered nickel electrode result in brittleness of the sintered nickel substrate. Thus, the sintered nickel electrode is susceptible to improvement in the charge/discharge cycle characteristics.

In this connection, proposals have been made in the art as follows. For instance, Japanese Unexamined Patent Publication No.1(1989)-200555 discloses a process aimed at the increase in the conductivity of the active material for improved utilization thereof, the process comprising the steps of laying a cobalt hydroxide layer on a surface of the active material loaded into the porous sintered substrate, and oxidizing the cobalt hydroxide layer by heat treatment in the presence of oxygen and an alkaline solution. Further, Japanese Unexamined Patent Publication No.63(1985)-216268 discloses a process aimed at the suppression of corrosion of the sintered nickel substrate during the loading of the active material and the improvement in the charge/discharge cycle characteristics of the alkaline secondary battery, the process comprising the steps of laying a cobalt hydroxide layer on a surface of a porous sintered nickel substrate, heating the substrate in the presence of oxygen and an alkaline solution, and then loading the nickel hydroxide-based active material into the sintered nickel substrate.

Unfortunately, where the sintered nickel electrode of Japanese Unexamined Patent Publication No.1-200555 is used as the positive electrode of the alkaline secondary battery, the alkaline secondary battery still suffers the occurrence of self discharge due to the oxygen evolution in the sintered nickel electrode when the charged battery is stored at high temperatures of about 50° C. over an extended period of time. Thus, the alkaline secondary battery is reduced in capacity.

Where the sintered nickel electrode of Japanese Unexamined Patent Publication No.63-216268(Japanese Examined Patent Publication No.5(1993)-50099) is used as the positive electrode of the alkaline secondary battery, as well, the oxygen evolution occurs in the alkaline secondary battery charged at high temperatures of about 50° C. before the positive electrode is charged to full. As a result, the battery is decreased in charge efficiency.

Further, Japanese Unexamined Patent Publication No.48 (1973)-50233 has proposed a sintered nickel electrode employing a positive-electrode active material incorporating yttrium hydroxide for improvement in the utilization thereof under high temperature conditions. Alternatively, Japanese unexamined Patent Publication No.5(1993)-28992 discloses an alkaline secondary battery employing a nickel oxide-based active material with a compound, such as yttrium, indium, antimony and the like, added thereto for accomplishing improvement in the utilization of the active material under high temperature conditions.

In those batteries of the above official gazettes, however, the compounds such as of yttrium or the like, are simply added to the active materials and thud, the active materials or the sintered nickel substrates are not sufficiently covered with the compounds such as of yttrium of the like. This detrimentally allows for contact between the electrolyte and the active material and/or the sintered nickel substrate. Hence, there still exists the problem of the oxygen evolution in the nickel electrode under high temperature conditions and of the underutilization of the active material.

In the previous PCT application (PCT/JP99/00720), the present inventors have proposed a nickel electrode for alkaline secondary battery wherein a coating layer is laid on a surface portion of the nickel hydroxide-based active material loaded into the sintered nickel substrate, and is based on a hydroxide of at least one element selected from the group consisting of calcium, strontium, scandium, yttrium, lanthanide and bismuth, as well as a nickel electrode for alkaline secondary battery wherein an intermediate layer is interposed between the sintered nickel substrate and the above active material, and is based on a hydroxide of at least one element selected from the group consisting of calcium, strontium, scandium, yttrium, lanthanide and bismuth.

Where such a nickel electrode for alkaline secondary battery is used as the positive electrode for alkaline secondary battery, the self discharge due to the oxygen evolution in the nickel electrode is suppressed during the long term storage of the charged alkaline secondary battery under high temperature conditions. Thus are provided the alkaline secondary batteries excellent in high temperature storability.

Recently, however, there is an additional desire for a further increased discharge capacity at high current in order to cope with the aforementioned favorable use of the alkaline secondary batteries in the electric power tools.

SUMMARY OF THE INVENTION

An object of the invention is to improve the nickel electrode for alkaline secondary battery comprising a porous sintered nickel substrate loaded with a nickel hydroxide-based active material, for suppression of the self discharge of the alkaline secondary battery employing this nickel electrode as the positive electrode and for enhancement of the storability of the battery stored under high temperature conditions.

Another object of the invention is to improve the alkaline secondary battery employing the above nickel electrode as the positive electrode in the high density current charge/discharge characteristics (high-rate characteristics).

According to a first aspect of the invention, a nickel electrode for alkaline secondary battery including a porous sintered nickel substrate loaded with a nickel hydroxide-based active material, the nickel electrode comprises a first coating layer of cobalt compound laid on a surface portion of the active material loaded into the sintered nickel substrate; and a second coating layer laid on the first coating layer and based on a compound of at least one element selected from the group consisting of nickel, magnesium, calcium, barium, strontium, scandium, yttrium, lanthanide and bismuth.

The lanthanide in the second coating layer of the nickel electrode for alkaline secondary battery according to the first aspect hereof may be composed of at least one element selected from the group consisting of lanthanum, cerium, praseodymium, neodymium, samarium, europium and ytterbium.

According to a second aspect of the invention, a nickel electrode for alkaline secondary battery including a porous sintered nickel substrate loaded with a nickel hydroxide-based active material, the nickel electrode comprises a first coating layer of cobalt compound laid on a surface portion of the active material loaded into the sintered nickel substrate, and a second coating layer laid on the first coating layer and based on a complex compound of cobalt and at least one element selected from the group consisting of nickel, magnesium, calcium, barium, strontium, scandium, yttrium, lanthanide and bismuth.

The lanthanide in the second coating layer of the nickel electrode for alkaline secondary battery according to the second aspect hereof may be composed of at least one element selected from the group consisting of lanthanum, cerium, praseodymium, neodymium, samarium, europium and ytterbium.

Where an alkaline secondary battery is fabricated using the nickel electrode of the first or second aspect hereof as the positive electrode therefor, the first and second coating layers on the surface portion of the active material loaded into the porous sintered nickel substrate serve to prevent the electrolyte from coming into contact with the active material and the sintered nickel substrate. Additionally, the cobalt compound in the first coating layer increases conductivity, thus contributing to an increased discharge capacity. On the other hand, because of the compound of nickel, magnesium and/or the like or the complex compound of cobalt and magnesium and/or the like forming the second coating layer, the oxygen evolution is suppressed and hence, the self discharge is prevented during storage of the charged battery under high temperature conditions. This results in the improvement of the high temperature storability.

In the nickel electrode for alkaline secondary battery of the first and second aspects hereof, the second coating layer may preferably employ such a compound of nickel, magnesium and/or the like or such a complex compound of cobalt and magnesium and/or the like as that which is relatively stably present in the alkaline secondary battery. For this reason, the above compound or complex compound is preferably composed of a hydroxide, an oxide or a mixture of these.

If, in the second coating layers of the nickel electrodes of the first and second aspects hereof, the compound of nickel, magnesium and/or the like or the complex compound of cobalt and nickel, magnesium and/or the like contains the above element(s) (including cobalt) in insufficient concentrations, the alkaline secondary battery is not sufficiently improved in the high temperature storability. On the other hand, if the element(s) are contained in excessive concentrations, the alkaline secondary battery cannot attain a sufficient battery capacity because the loading ratio of the active material in the nickel electrode is decreased. Accordingly, the compound or complex compound of the second coating layer preferably contains the above element (s) (including cobalt) in the range of 0.05 to 5 wt % based on the total weight of the active material, and first and second coating layers.

The nickel electrode for alkaline secondary battery of the first aspect hereof may be fabricated by the steps of: dipping the sintered substrate loaded with the nickel hydroxide-based active material in a solution of cobalt salt and then dipping this sintered substrate in an aqueous alkaline solution thereby forming the first coating layer of cobalt compound on the active-material surface portion; and dipping the sintered substrate in a solution containing a salt of at least one element selected from the group consisting of nickel, magnesium, calcium, barium, strontium, scandium, yttrium, lanthanide and bismuth and then dipping the sintered substrate in the aqueous alkaline solution thereby forming the second coating layer on the first coating layer.

The nickel electrode for alkaline secondary battery of the second aspect hereof may be fabricated by the steps of: dipping the sintered substrate loaded with the nickel hydroxide-based active material in a solution of cobalt salt and then dipping this sintered substrate in the aqueous alkaline solution thereby forming the first coating layer of the cobalt compound on the active-material surface portion; and dipping the sintered substrate in a solution containing a cobalt salt and a salt of at least one element selected from the group consisting of nickel, magnesium, calcium, barium, strontium, scandium, yttrium, lanthanide and bismuth and then dipping the sintered substrate in the aqueous alkaline solution thereby forming the second coating layer on the first coating layer.

According to a third aspect of the invention, a nickel electrode for alkaline secondary battery including a porous sintered nickel substrate loaded with a nickel hydroxide-based active material, the nickel electrode comprises a layer laid between a surface portion of the active material loaded into the sintered nickel substrate and/or the sintered nickel substrate, and the active material, the layer based on a complex compound of nickel and at least on element selected from the group consisting of cobalt, calcium, strontium, scandium, yttrium, lanthanide, bismuth, magnesium and barium.

The lanthanide in the above layer may be composed of at least one element selected from the group consisting of lanthanum, cerium, praseodymium, neodymium, europium and ytterbium.

Where an alkaline secondary battery is fabricated using the nickel electrode of the third aspect hereof as the positive electrode therefor, the above layer between the surface portion of the active material loaded into the porous sintered nickel substrate and/or the sintered nickel substrate, and the active material prevents the electrolyte from coming into contact with the active material and sintered nickel substrate.

In the nickel electrode for alkaline secondary battery of the third aspect hereof, the layer between the active-material surface portion and/or the sintered nickel substrate, and the active material contains the complex compound of nickel and the aforesaid element(s) and therefore, the nickel compound of this layer promotes the charge/discharge reactions thereby improving the alkaline secondary battery in the high-current discharge capacity. In addition, the compound of the aforesaid element(s), such as cobalt and calcium and the like, suppresses the oxygen evolution during storage of the charged battery under high temperature conditions and hence, the self discharge is prevented. This results in the enhanced high temperature storability.

In the nickel electrode for alkaline secondary battery of the third aspect hereof, the above layer may preferably employ such a complex compound as that which is relatively stably present in the alkaline secondary battery. For this reason, the above complex compound is preferably composed of a hydroxide, an oxide or a mixture of these.

In the layer based on the complex compound of nickel and the aforesaid element(s) and laid between the surface portion of the active material loaded into the sintered nickel substrate and/or the sintered nickel substrate, and the active material, if the aforesaid complex compound is contained in insufficient concentrations, inabilities to adequately suppress the reaction between the electrolyte and the active material and the like and to adequately improve the high temperature storability of the alkaline secondary battery result. On the other hand, if the complex compound is contained in excessive concentrations, the alkaline secondary battery cannot attain a sufficient capacity because the loading ratio of the active material in the nickel electrode is decreased. Accordingly, a mixing ratio of the complex compound in the aforesaid layer is preferably in the range of 0.5 to 5 wt % based on the total weight of all the loaded materials which include the nickel hydroxide-based active material. Further, the above layer preferably contains the compound of the element(s) selected from the group consisting of cobalt, calcium, strontium, scandium, yttrium, lanthanide, bismuth, magnesium and barium in a total weight percentage of 0.3 to 3 wt % based on the total weight of all the loaded materials which include the nickel hydroxide-based active material loaded into the sintered nickel substrate.

According to a fourth aspect of the invention, a nickel electrode for alkaline secondary battery including a porous sintered nickel electrode loaded with a nickel hydroxide-based active material, the nickel electrode comprises a first coating layer which is laid on a surface portion of the active material loaded into the sintered nickel substrate and is based on a compound of at least one element selected from the group consisting of magnesium, calcium, barium, strontium, scandium, yttrium, lanthanide and bismuth, and a second coating layer of cobalt compound laid on the first coating layer.

According to a fifth aspect of the invention, a nickel electrode for alkaline secondary battery including a porous sintered nickel substrate loaded with a nickel hydroxide-based active material, the nickel electrode comprises a first coating layer which is laid on a surface portion of the active material loaded into the sintered nickel substrate and is based on a complex compound of cobalt and at least one element selected from the group consisting of magnesium, calcium, barium, strontium, scandium, yttrium, lanthanide and bismuth, and a second coating layer of cobalt compound laid on the first coating layer.

The lanthanide in the first coating layer of the nickel electrodes for alkaline secondary battery according to the fourth and fifth aspects hereof may be composed of at least one element selected from the group consisting of lanthanum, cerium, praseodymium, neodymium, europium and ytterbium.

Where an alkaline secondary battery is fabricated using the nickel electrode of the fourth or fifth aspect hereof as the positive electrode therefor, the first and second coating layers laid on the surface portion of the active material loaded into the porous sintered nickel substrate prevent the electrolyte from coming into contact with the active material and sintered nickel substrate. Additionally, because of the compound of magnesium, calcium and/or the like or the complex compound of cobalt and magnesium, calcium and/or the like in the first coating layer, the oxygen evolution is suppressed and hence, the self discharge is prevented during storage of the charged battery under high temperature conditions. This results in the improvement in the high temperature storability. At the same time, the cobalt compound in the second coating layer increases conductivity, allowing for discharge at high voltage. Particularly, as suggested by the nickel electrode of the fifth aspect hereof, the first coating layer, which is based on the complex compound of cobalt and magnesium, calcium and/or the like, is further improved in conductivity, thus contributing to an even greater high temperature storability and allowing for discharge at an even higher voltage.

In the nickel electrodes for alkaline secondary battery of the fourth and fifth aspects hereof, the first coating layer may preferably employ such a compound of magnesium, calcium and the like or such a complex compound of cobalt and magnesium, calcium and/or the like as that which is relatively stably present in the alkaline secondary battery. For this reason, the above compound or complex compound is preferably composed of a hydroxide, an oxide or a mixture of these.

In the nickel electrodes of the fourth and fifth aspects hereof, if the first coating layer contains the compound of magnesium, calcium or the like, or the complex compound of cobalt and magnesium, calcium and/or the like in insufficient concentrations, inabilities to adequately suppress the reaction between the electrolyte and the active material and to sufficiently improve the high temperature storability result. On the other hand, if the compound or complex compound is contained in excessive concentrations, the battery cannot attain a sufficient battery capacity because the loading ratio of the active material in the nickel electrode is decreased. Accordingly, a mixing ratio of the compound or complex compound in the first coating layer is preferably in the range of 0.5 to 5 wt % based on the total weight of the active material, and first and second coating layers.

In the nickel electrodes of the fourth and fifth aspects hereof, if the second coating layer contains the cobalt compound in insufficient concentrations, the nickel electrode for alkaline secondary battery is not sufficiently improved in conductivity and an inability to discharge at high voltage results. On the other hand, if the compound is contained in excessive concentrations, the battery cannot attain a sufficient battery capacity because the loading ratio of the active material in the nickel electrode is decreased.

Accordingly, a mixing ratio of the cobalt compound in the second coating layer is preferably in the range of 0.5 to 5 wt % based on the total weight of the active material, and first and second coating layers.

According to a sixth aspect of the invention, a nickel electrode for alkaline secondary battery including a porous sintered nickel substrate loaded with a nickel hydroxide-based active material, the nickel electrode comprises a layer which is laid between a surface portion of the active material on the porous sintered nickel substrate and/or the sintered nickel substrate, and the active material, and which is based on a complex compound of at least one element selected from the group consisting of cobalt and nickel, and at least one element selected from the group consisting of manganese, aluminum, iron, copper and silver.

Where an alkaline secondary battery is fabricated using the nickel electrode of the sixth aspect hereof as the positive electrode therefor, the aforesaid layer, which is laid between the surface portion of the active material loaded into the porous sintered nickel substrate and/or the sintered nickel substrate, and the active material, prevents the electrolyte from coming into contact with the active material and sintered nickel substrate.

In the nickel electrode for alkaline secondary battery according to the sixth aspect hereof, the layer between the surface portion of the active material and/or the sintered nickel substrate and the active material employs the complex compound of at least one element selected from the group of cobalt and nickel and at least one element selected from the group of manganese, aluminum, iron, copper and silver, such that the self discharge due to the oxygen evolution is prevented during storage of the charged electrode under high temperature conditions. Thus, the alkaline secondary battery is improved in the high temperature storability. In addition, the electrode with this complex compound provides smoother charge/discharge reactions than the conventional sintered nickel electrode formed with a manganese hydroxide layer over its surface, thus allowing for the discharge at high voltage. Furthermore, the complex compound also suppresses the expansion of the nickel electrode for alkaline secondary battery thereby improving the charge/discharge cycle characteristics of the battery.

In the nickel electrode for alkaline secondary battery of the sixth aspect hereof, the above layer may preferably employ such a complex compound as that which is relatively stably present in the alkaline secondary battery. For this reason, the above complex compound is preferably composed of a hydroxide, an oxide or a mixture of these.

In the layer which is laid between the surface portion of the active material loaded into the sintered nickel substrate and/or the sintered nickel substrate, and the active material and which is based on the above complex compound, if the layer contains the complex compound in insufficient concentrations, inabilities to adequately suppress the reaction between the electrolyte and the active material and the like and to sufficiently improve the alkaline secondary battery in the high temperature storability result. If, on the other hand, the layer contains the complex compound in excessive concentrations, the battery cannot attain a sufficient battery capacity because the loading ratio of the active material in the nickel electrode for alkaline secondary battery is decreased. Besides, the alkaline secondary battery is lowered in the charge/discharge cycle characteristics because of decreased discharge voltage. Accordingly, a mixing ratio of the complex compound in the above layer is preferably in the range of 0.5 to 5 wt % based on the total weight of all the loaded materials which include the nickel hydroxide-based active material. Further, the above layer preferably contains the compound of the element(s) selected from the group of manganese, aluminum, iron, copper and silver in a total weight percentage of 0.3 to 3 wt % based on the total weight of all the loaded materials which include the nickel hydroxide-based active material loaded into the sintered nickel substrate.

According to a seventh aspect of the invention, a nickel electrode for alkaline secondary battery including a porous sintered nickel substrate loaded with a nickel hydroxide-based active material, the nickel electrode comprises a coating layer which is laid on a surface portion of the active material loaded into the sintered nickel substrate and which contains a complex compound of at least one element selected from the group consisting of yttrium and ytterbium and at least one element selected from the group consisting of manganese, aluminum, iron, copper and silver.

According to an eighth aspect of the invention, a nickel electrode for alkaline secondary battery including a porous sintered nickel substrate loaded with a nickel hydroxide-based active material, the nickel electrode comprises a coating layer which is laid on a surface portion of the active material loaded into the sintered nickel substrate and which contains a complex compound of at least one element selected from the group consisting of yttrium and ytterbium, at least one element selected from the group consisting of manganese, aluminum, iron, copper and silver, and at least one element selected from the group consisting of cobalt and nickel.

Where an alkaline secondary battery is fabricated using the nickel electrode for alkaline secondary battery of the seventh or eight aspect hereof as the positive electrode therefor, the above coating layer on the surface portion of the active material loaded into the porous sintered nickel substrate prevents the electrolyte from coming into contact with the active material and sintered nickel substrate, thereby suppressing the self discharge.

In the nickel electrodes for alkaline secondary battery according to the seventh and eighth aspects hereof, the coating layers employ the aforesaid complex compound, yttrium and/or ytterbium of which is more effective to suppress the oxygen evolution and hence the self discharge in the charged electrode stored under high temperature conditions, as compared with the conventional sintered nickel electrode formed with the manganese hydroxide layer over its surface. Thus, the alkaline secondary battery is improved in the high temperature storability and the charge efficiency at high temperatures. The complex compounds also provide smooth charge/discharge reactions, allowing for discharge at high voltage. In addition, the expansion of the nickel electrode for alkaline secondary battery is prevented and thus, the alkaline secondary battery is improved in the charge/discharge cycle characteristics.

In the nickel electrode for alkaline secondary battery of the eight aspect hereof, the complex compound of the coating layer further contains at least one element selected from the group of cobalt and nickel so that the coating layer is improved in the conductivity and the battery reactions. This allows for high voltage discharge and contributes to the improvement of the charge/discharge cycle characteristics.

In the nickel electrodes for alkaline secondary battery of the seventh and eighth aspects hereof, the above coating layers may preferably employ such a complex compound as that which is relatively stably present in the alkaline secondary battery. For this reason, the above complex compound is preferably composed of a hydroxide, an oxide or a mixture of these.

In the nickel electrodes for alkaline secondary battery according to the seventh and eighth aspects hereof, if the coating layers contain the above complex compounds in insufficient concentrations, the coating layers are incapable of adequately suppressing the reactions between the electrolyte and the active material and of sufficiently improving the alkaline secondary batteries in the high temperature storability. If, on the other hand, the coating layers contain the complex compounds in excessive concentrations, the battery cannot attain a sufficient battery capacity because the loading ratio of the active material in the nickel electrode for alkaline secondary battery is decreased. In addition, the alkaline secondary battery is lowered in the discharge voltage and suffers the expansion of the nickel electrode thereof which results from the increase in an undischarged portion of the electrode. This leads to lowered charge/discharge cycle characteristics of the battery. Accordingly, a mixing ratio of the complex compound in the coating layer is preferably in the range of 0.5 to 5 wt % based on the total weight of the active material and coating layer.

If the above complex compound contains the compound of the element(s) selected from the group of manganese, aluminum, iron, copper and silver in insufficient concentrations, the alkaline secondary battery is lowered in the high temperature storability and cycle characteristics. If, on the other hand, the complex compound contains such a compound in excessive concentrations, the alkaline secondary battery is lowered in the working voltage and the charge efficiency at high temperatures. Hence, the complex compound preferably contains the compound of the element(s) selected from the group of manganese, aluminum, iron, copper and silver in a total weight percentage of 0.3 to 3 wt % and more preferably 2 to 3 wt % based on the total weight of the active material and coating layer.

If the complex compound contains the compound of the element(s) selected from the group of yttrium and ytterbium in insufficient concentrations, the alkaline secondary battery is lowered in the working voltage and the charge efficiency at high temperatures. If, on the other hand, the complex compound contains such a compound in excessive concentrations, the alkaline secondary battery is lowered in the high temperature storability and cycle characteristics. Hence, the complex compound preferably contains the compound of the element(s) selected from the group of yttrium and ytterbium in a total weight percentage of 0.3 to 3 wt % and more preferably 2 to 3 wt % based on the total weight of the active material and coating layer.

Incidentally, it is preferred that zinc, cadmium, magnesium, cobalt, manganese or the like is incorporated into the nickel hydroxide-based active material as solid solution for the prevention of the expansion of the nickel electrode during the charge/discharge processes of the alkaline secondary battery employing any of the nickel electrodes of the first to eighth aspects hereof.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Now, nickel electrodes for alkaline secondary battery and alkaline secondary batteries employing the same according to the preferred embodiments of the invention will hereinbelow be described in detail while comparative examples will be cited to demonstrate advantages of the nickel electrodes for alkaline secondary battery and the alkaline secondary batteries employing the same according to the preferred embodiments hereof. It should be appreciated that the nickel electrodes for alkaline secondary battery and the alkaline secondary batteries of the invention are not limited to the following examples but variations and modifications thereto may be made within the scope and spirit of the invention.

EXAMPLES A1 TO A15

In fabrication of nickel electrodes for alkaline secondary battery of Examples A1 to A15, there was used a porous sintered nickel substrate prepared in the following manner.

The porous sintered nickel substrate was prepared by the steps of: forming a nickel slurry by kneading carbonyl nickel powder and a binder; spreading the slurry on a 50 $\mu$m thick punched foil; allowing the slurry to dry; and sintering the slurry in a reducing atmosphere. The resultant porous sintered nickel substrate had a porosity of 85% and a thickness of 0.65 mm.

Subsequently, a nickel hydroxide-based active material was loaded into the sintered nickel substrate using six impregnation cycles, where each cycle comprised the steps of: dipping the sintered nickel substrate into an aqueous solution mixture of nickel nitrate and cobalt nitrate (specific gravity:1.75, atomic ratio between nickel and cobalt:10:1) thereby impregnating the sintered nickel substrate with the aqueous solution mixture of nickel nitrate and cobalt nitrate; and dipping the sintered nickel substrate into a 25% NaOH aqueous solution thereby allowing hydroxides of nickel and cobalt to deposit onto the sintered nickel substrate.

Figure 1:
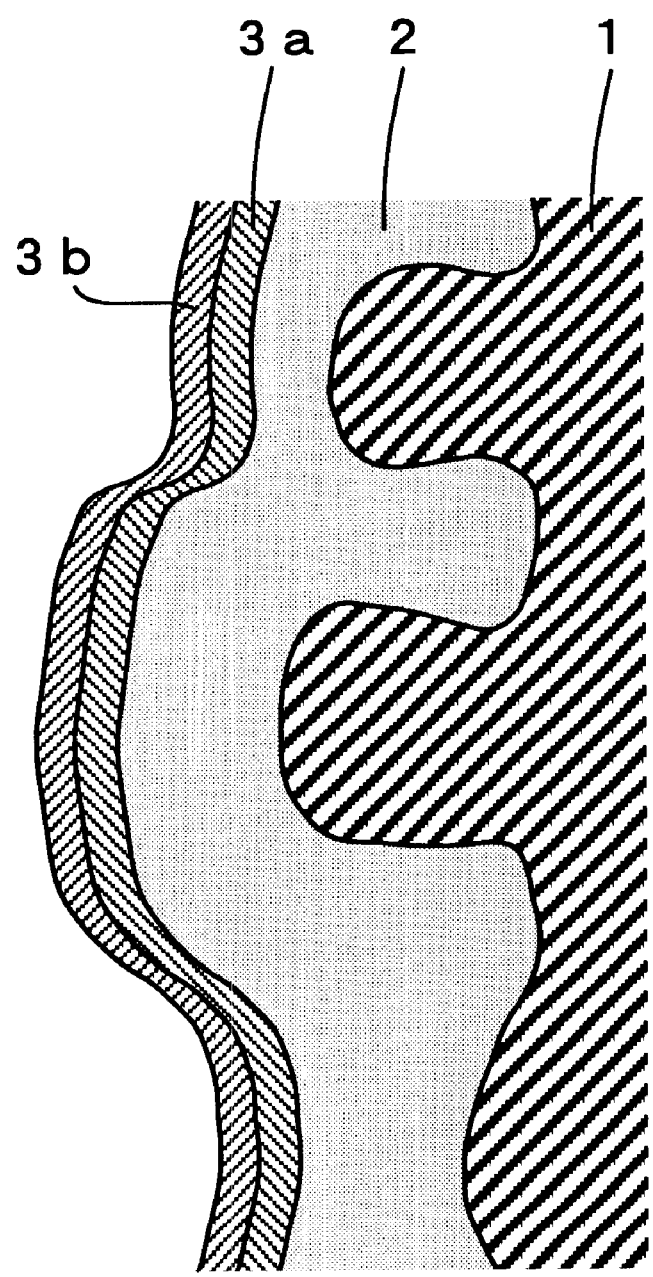
FIG. 1 is a schematic sectional view showing an exemplary nickel electrode for alkaline secondary battery according to the invention wherein a first coating layer and a second coating layer are sequentially laid on a surface portion of an active material loaded into a porous sintered nickel substrate.

Next, as shown in FIG. 1, a first coating layer 3a and a second coating layer 3b were sequentially laid on the active material 2 thus loaded into the sintered nickel substrate 1. Although the figure illustrates the active material layer 2, first coating layer 3a and second coating layer 3b uniformly overlaid on one another on the sintered nickel substrate 1, it is to be noted that the active material layer 2, first coating layer 3a and second coating layer 3b each may be partially broken or may not be observed as a totally independent layer.

The first coating layer 3a of cobalt hydroxide was laid on the active material loaded into the sintered nickel substrate by the steps of: dipping the sintered nickel substrate with the active material into an aqueous solution of 3 wt % cobalt nitrate; and dipping the substrate into the 25% NaOH aqueous solution at 80° C.

There were prepared aqueous solutions of 3 wt % nitrates for Examples A1 to A15. Specifically, there were used nickel (Ni) nitrate for Example A1; magnesium (Mg) nitrate for Example A2; calcium (Ca) nitrate for Example A3; barium (Ba) nitrate for Example A4; strontium (Sr) nitrate for Example A5; scandium (Sc) nitrate for Example A6; yttrium (Y) nitrate for Example A7; lanthanide (La) nitrate for Example A8; cerium (Ce) nitrate for Example A9; praseodymium (Pr) nitrate for Example A10; neodymium (Nd) nitrate for Example A11; samarium (Sm) nitrate for Example A12; europium (Eu) nitrate for Example A13; ytterbium (Yb) nitrate for Example A14; and bismuth (Bi) nitrate for Example A15.

The sintered nickel substrate formed with the first coating layer was dipped into each of the above aqueous nitrate solutions and then dipped into the 25% NaOH aqueous solution at 80° C. Thus, the respective second coating layers of hydroxides of the elements listed in Table 1 as below were laid on the surface of the first coating layer.

The resultant first and second coating layers substantially had a constant weight per unit area of 5 to 6 mg/cm$^2$ regardless of the element types. The weight of the first or second coating layer accounted for 2.9 to 3 wt % based on the total weight of all the loaded materials of the first and second coating layers, and active material.

The weight percentage of each element of the above second coating layers was determined based on the total weight of all the loaded materials of the first and second coating layers, and active material. The resultant weight percentages of the elements were in the range of 1.3 to 2.4 wt %, as shown in Table 1.

The following procedure was taken to fabricate respective alkaline secondary batteries of Examples A1 to A15 having a battery capacity of about 1.0 Ah, using the respective nickel electrodes for alkaline secondary battery as the positive electrode therefor and a hydrogen-absorbing alloy represented by a composition formula of $Mm_{1.0}Ni_{3.2}Co_{1.0}Al_{0.2}Mn_{0.6}$ as the negative electrode. The procedure comprised the steps of: inserting a separator of polyolefin nonwoven fabric between the positive and negative electrodes and winding them into a roll shape; placing the roll into a battery can; filling the battery can with 6-normal solution of potassium hydroxide as the electrolyte; and sealing the battery can.

COMPARATIVE EXAMPLES A1 TO A15

In fabrication of nickel electrodes for alkaline secondary battery of Comparative Examples a1 to a15, the formation of the first coating layer of cobalt hydroxide was dispensed with and only the second coating layers were laid on the active material loaded into the sintered nickel substrate in correspondence with those of Examples A1 to A15.

Alkaline secondary batteries of Comparative Examples a1 to a15 were fabricated the same way as Examples A1 to A15 correspondingly using the resultant nickel electrodes as the positive electrode therefor.

The resultant alkaline secondary batteries of Examples A1 to A15 and Comparative Examples a1 to a15 were cycled at room temperatures through 10 cycles with 16 hr charge using a 100 mA current and discharge to a voltage of 1.0 V using a 100 mA current.

On the 10th cycle, the discharge capacity $Q_{10}$ of each battery was determined and the results are listed in Tables 1 and 2 as below. After the 11th charge cycle, the batteries were subject to storage at 50° C. for two weeks. Subsequently, the batteries were placed under room temperatures again and discharged at 100 mA to 1.0 V so as to determine the discharge capacities $Q_{11}$ at cycle 11. The discharge capacity $Q_{10}$ at cycle 10 was compared with the discharge capacity $Q_{11}$ at cycle 11 so as to determine the high temperature storability based on the following equation:

$$\text{High-temperature storability}(\%) = (Q_{11}/Q_{10}) \times 100$$

The results are listed in Tables 1 and 2 as below.

TABLE 1

| | element of first coating layer | second coating layer element | weight percentage (wt %) | $Q_{10}$ (mAh) | high-temperature storability (%) |
|---|---|---|---|---|---|
| example A1 | Co | Ni | 1.9 | 1150 | 77 |
| example A2 | Co | Mg | 1.3 | 1170 | 72 |
| example A3 | Co | Ca | 1.6 | 1230 | 79 |
| example A4 | Co | Ba | 2.4 | 1120 | 73 |
| example A5 | Co | Sr | 2.2 | 1110 | 74 |
| example A6 | Co | Sc | 1.4 | 1100 | 79 |
| example A7 | Co | Y | 1.9 | 1250 | 80 |
| example A8 | Co | La | 2.2 | 1140 | 74 |
| example A9 | Co | Ce | 2.2 | 1100 | 77 |
| example A10 | Co | Pr | 2.2 | 1090 | 73 |
| example A11 | Co | Nd | 2.2 | 1100 | 72 |
| example A12 | Co | Sm | 2.2 | 1090 | 74 |
| example A13 | Co | Eu | 2.2 | 1090 | 76 |
| example A14 | Co | Yb | 2.3 | 1200 | 79 |
| example A15 | Co | Bi | 2.4 | 1210 | 78 |

TABLE 2

| | coating layer element | weight percentage (wt %) | $Q_{10}$ (mAh) | high-temperature storability (%) |
|---|---|---|---|---|
| comparative example a1 | Ni | 2.0 | 1000 | 62 |
| Comparative example a2 | Mg | 1.3 | 1000 | 57 |
| Comparative example a3 | Ca | 1.7 | 1050 | 64 |
| Comparative example a4 | Ba | 2.5 | 1000 | 57 |
| Comparative example a5 | Sr | 2.2 | 1000 | 58 |
| Comparative example a6 | Sc | 1.5 | 1000 | 64 |
| Comparative example a7 | Y | 2.0 | 1060 | 66 |
| Comparative example a8 | La | 2.3 | 1000 | 58 |
| Comparative example a9 | Ce | 2.3 | 1000 | 62 |
| Comparative example a10 | Pr | 2.3 | 1000 | 59 |
| Comparative example a11 | Nd | 2.3 | 1000 | 58 |
| Comparative example a12 | Sm | 2.3 | 1000 | 59 |
| Comparative example a13 | Eu | 2.3 | 1000 | 61 |
| Comparative example a14 | Yb | 2.4 | 1030 | 63 |

TABLE 2-continued

| | | coating layer | | high- |
|---|---|---|---|---|
| | element | weight percentage (wt %) | $Q_{10}$ (mAh) | temperature storability (%) |
| Comparative example a15 | Bi | 2.5 | 1040 | 62 |

As apparent from Tables 1 and 2, the alkaline secondary batteries of Examples A1 to A15 are all improved in the discharge capacity and high temperature storability on the 10th cycle as compared with the alkaline secondary batteries of Comparative Examples a1 to a15 which are free from the first coating layer of cobalt hydroxide, the batteries of Examples A1 to A15 each having the first coating layer of cobalt hydroxide formed on the active material loaded into the sintered nickel substrate and the second coating layer which is laid on the first coating layer and based on a hydroxide of an element selected from the group consisting of nickel, magnesium, calcium, barium, strontium, scandium, yttrium, lanthanide and bismuth.

EXAMPLES A16 TO A30

In fabrication of nickel electrodes of Examples A16 to A30, the same procedure as in Examples A1 to A15 was taken to form the first coating layer of cobalt hydroxide on the active material loaded into the sintered nickel substrate.

Preparatory to the formation of the second coating layer over the first coating layer, aqueous solutions of 3 wt % nitrates were prepared which each contained cobalt nitrate and a nitrate of a different element in a weight ratio of 1:1.

As the nitrate of the different element, nickel nitrate was used in Example A16; magnesium nitrate in Example A17; calcium nitrate in Example A18; barium nitrate in Example A19; strontium nitrate in Example A20; scandium nitrate in Example A21; yttrium nitrate in Example A22; lanthanum nitrate in Example A23; cerium nitrate in Example A24; praseodymium nitrate in Example A25; neodymium nitrate in Example A26; samarium nitrate in Example A27; europium nitrate in Example A28; ytterbium nitrate in Example A29; and bismuth nitrate in Example A30.

The sintered nickel substrate with the first coating layer was dipped into each of the above nitrate solutions, and then dipped into the 25% NaOH aqueous solution at 80° C. thereby to form the respective second coating layers based on nitrates of two elements as listed in Table 3 as below.

The resultant second coating layers substantially had a constant weight per unit area of 5 to 6 mg/cm² regardless of the different element types. The weight of the second coating layer accounted for 3 wt % based on the total weight of all the loaded materials of the first and second coating layers, and active material.

The weight percentage of cobalt and the different element in each second coating layer was determined based on the total weight of all the loaded materials of the first and second coating layers, and active material. The results were in the range of 1.6 to 2.2 wt % as shown in Table 3 as below.

Subsequently, alkaline secondary batteries of Examples A16 to A30 were fabricated using the respective nickel electrodes for alkaline secondary battery as the positive electrode therefor and the same procedure as in Examples A1 to A15.

COMPARATIVE EXAMPLES A16 TO A30

In fabrication of nickel electrodes of Comparative Examples a16 to a30, the formation of the first coating layer of cobalt hydroxide was dispensed with and only the second coating layers were laid on the active material loaded into the sintered nickel substrate in correspondence with those of Examples A16 to A30, as shown in Table 4.

Alkaline secondary batteries of Comparative Examples a16 to a30 were fabricated using the resultant nickel electrodes as the positive electrode therefor and the same procedure as in Examples A1 to A15.

COMPARATIVE EXAMPLE A31

In fabrication of a nickel electrode of Comparative Example a31, the active material was loaded into the sintered nickel substrate the same way as in Examples A1 to A15 and the formation of any coating layer thereon was dispensed with.

An alkaline secondary battery of Comparative Example a31 was fabricated using the resultant nickel electrode as the positive electrode therefor and the same procedure as in Examples A1 to A15.

COMPARATIVE EXAMPLE a32

In fabrication of a nickel electrode of Comparative Example a32, the active material was loaded into the sintered nickel substrate the same way as in Examples A1 to A15 and only the coating layer of cobalt hydroxide was laid thereon.

An alkaline secondary battery of Comparative Example a32 was fabricated using the resultant nickel electrode as the positive electrode therefor and the same procedure as in Examples A1 to 15.

Similarly to Examples A1 to A15 and Comparative Examples a1 to a15, the discharge capacity $Q_{10}$ at cycle 10 and the high temperature storability were determined for the respective alkaline secondary batteries of Examples A16 to A30 and Comparative Examples a16 to a32. The results are listed in Tables 3 and 4 as below.

TABLE 3

| | element of first coating layer | second coating layer | | | high-temperature storability (%) |
|---|---|---|---|---|---|
| | | element | weight percentage (wt %) | $Q_{10}$ (mAh) | |
| example A16 | Co | Co + Ni | 1.9 | 1190 | 79 |
| example A17 | Co | Co + Mg | 1.6 | 1200 | 74 |
| example A18 | Co | Co + Ca | 1.8 | 1260 | 82 |
| example A19 | Co | Co + Ba | 2.2 | 1150 | 75 |
| example A20 | Co | Co + Sr | 2.0 | 1140 | 76 |
| example A21 | Co | Co + Sc | 1.7 | 1140 | 81 |
| example A22 | Co | Co + Y | 1.9 | 1280 | 82 |
| example A23 | Co | Co + La | 2.0 | 1160 | 76 |
| example A24 | Co | Co + Ce | 2.1 | 1130 | 79 |
| example A25 | Co | Co + Pr | 2.1 | 1120 | 75 |
| example A26 | Co | Co + Nd | 2.1 | 1130 | 74 |
| example A27 | Co | Co + Sm | 2.1 | 1120 | 76 |
| example A28 | Co | Co + Eu | 2.1 | 1110 | 78 |
| example A29 | Co | Co + Yb | 2.1 | 1230 | 82 |
| example A30 | Co | Co + Bi | 2.2 | 1240 | 81 |

TABLE 4

| | coating layer | | | high-temperature storability (%) |
|---|---|---|---|---|
| | element | weight percentage (wt %) | $Q_{10}$ (mAh) | |
| comparative example a16 | Co + Ni | 2.0 | 1020 | 64 |
| comparative example a17 | Co + Mg | 1.6 | 1020 | 60 |
| Comparative example a18 | Co + Ca | 1.8 | 1080 | 68 |
| Comparative example a19 | Co + Ba | 2.2 | 1000 | 61 |
| Comparative example a20 | Co + Sr | 2.1 | 1000 | 61 |
| Comparative example a21 | Co + Sc | 1.7 | 1000 | 67 |
| Comparative example a22 | Co + Y | 2.0 | 1080 | 68 |
| Comparative example a23 | Co + La | 2.1 | 1010 | 61 |
| Comparative example a24 | Co + Ce | 2.1 | 1000 | 64 |
| Comparative example a25 | Co + Pr | 2.1 | 1000 | 62 |
| Comparative example a26 | Co + Nd | 2.1 | 1000 | 62 |
| Comparative example a27 | Co + Sm | 2.1 | 1000 | 63 |
| Comparative example a28 | Co + Eu | 2.1 | 1000 | 64 |
| Comparative example a29 | Co + Yb | 2.2 | 1060 | 66 |
| Comparative example a30 | Co + Bi | 2.2 | 1080 | 67 |
| Comparative example a31 | — | — | 900 | 49 |
| Comparative example a32 | Co | 1.9 | 1000 | 52 |

As apparent from Tables 3 and 4, the alkaline secondary batteries of Examples A16 to A30, wherein the first coating layer of cobalt hydroxide is laid on the active material loaded into the sintered nickel substrate and the second coating layer of the complex hydroxide of cobalt and an element selected from the group of nickel, magnesium, calcium, barium, strontium, scandium, yttrium, lanthanide and bismuth was laid on the first coating layer, have greater discharge capacities at cycle 10 and high temperature storabilities than those of Comparative Examples a15 to a30 free from the first coating layer of cobalt compound, that of Comparative Example a31 without any coating layer, and that of Comparative Example a32 without the second coating layer of the complex hydroxide.

EXAMPLES A7.1 TO A7.10

The following procedure was taken to fabricate nickel electrodes of Examples A7.1 to A7.10. The active material was loaded into the sintered nickel substrate the same way as in Examples A1 to A15. Then, first coating layers differing in the concentration of cobalt were formed on the active material using aqueous solutions varied in the concentration of cobalt nitrate as shown in Table 5 as below. The second coating layer of yttrium hydroxide was formed on each of the first coating layers the same way as in Example A7.

The weight percentage of cobalt in the respective first coating layers was determined based on the total weight of all the loaded materials of the first and second coating layers, and active material. The results are listed in Table 5.

Alkaline secondary batteries of Examples A7.1 to A7.10 were fabricated using the respective nickel electrodes as the positive electrode therefor and the same procedure as in Examples A1 to A15.

Similarly to Examples A1 to A15 and Comparative Examples a1 to a15, the discharge capacity $Q_{10}$ at cycle 10 and the high temperature storability were determined for the respective alkaline secondary batteries of Examples A7.1 to A7.10. The results are listed in Table 5 as below.

TABLE 5

| | content of Co nitrate (wt %) | content of cobalt (wt %) | $Q_{10}$ (mAh) | high-temperature storability (%) |
|---|---|---|---|---|
| example A7.1 | 0.03 | 0.01 | 1140 | 77 |
| example A7.2 | 0.05 | 0.02 | 1150 | 78 |
| example A7.3 | 0.1 | 0.05 | 1200 | 79 |
| example A7.4 | 0.2 | 0.1 | 1210 | 80 |
| example A7.5 | 2 | 1 | 1230 | 80 |
| example A7.6 | 3 | 1.8 | 1250 | 80 |
| example A7.7 | 5 | 3 | 1240 | 80 |
| example A7.8 | 8 | 5 | 1220 | 79 |
| example A7.9 | 10 | 7 | 1150 | 78 |
| example A7.10 | 15 | 10 | 1140 | 77 |

As apparent from Table 5, the discharge capacity at cycle 10 and the high temperature storability are improved in the batteries wherein the first coating layer contains cobalt in concentrations of 0.05 to 5 wt % based on the total weight of the active material, and first and second coating layers.

EXAMPLES A7.11 TO A7.20

In fabrication of nickel electrodes of Examples A7.11 to A7.20, the same procedure as in Examples A1 to A15 was taken to form the first coating layer on the active material loaded into the sintered nickel substrate. Then, second coating layers differing in the concentration of yttrium were laid on the first coating layers using aqueous solutions varied in the concentration of yttrium nitrate as listed in Table 6 as below.

The weight percentage of yttrium in each second coating layer was determined based on the total weight of all the loaded materials of the first and second coating layers, and active material. The results are listed in Table 6.

Alkaline secondary batteries of Examples A7.11 to A7.20 were fabricated using the respective nickel electrodes as the positive electrode therefor and the same procedure as in Examples A1 to A15.

Similarly to Examples A1 to A15 and Comparative Examples a1 to a15, the discharge capacity $Q_{10}$ at cycle 10 and the high temperature storability were determined for the respective alkaline secondary batteries of Examples A7.11 to A7.20. The results are listed in Table 6 as below.

TABLE 6

| | content of Y nitrate (wt %) | content of Y (wt %) | $Q_{10}$ (mAh) | high-temperature storability (%) |
|---|---|---|---|---|
| example A7.11 | 0.03 | 0.01 | 1220 | 69 |
| example A7.12 | 0.04 | 0.02 | 1230 | 72 |
| example A7.13 | 0.1 | 0.05 | 1240 | 77 |
| example A7.14 | 0.2 | 0.1 | 1240 | 78 |
| example A7.15 | 2 | 1 | 1250 | 79 |
| example A7.16 | 3 | 1.9 | 1250 | 80 |
| example A7.17 | 5 | 3 | 1230 | 81 |
| example A7.18 | 8 | 5 | 1200 | 81 |

TABLE 6-continued

|  | content of Y nitrate (wt %) | content of Y (wt %) | $Q_{10}$ (mAh) | high-temperature storability (%) |
|---|---|---|---|---|
| example A7.19 | 11 | 7 | 1150 | 81 |
| example A7.20 | 14 | 10 | 1100 | 81 |

As apparent from Table 6, the high temperature storability is lowered where the second coating layer contains yttrium in concentrations of less than 0.05 wt % based on the total weight of all the loaded materials of the active material, and first and second coating layers. Where the second coating layer contains yttrium in concentrations of more than 5 wt %, the discharge capacity at cycle 10 is lowered. Therefore, it is desirable that the second coating layer contains yttrium in the weight percentage of 0.05 to 5 wt % based on the total weight of all the loaded materials of the active material, and first and second coating layers.

EXAMPLES B1 TO B14

In Examples B1 to B14, as well, the same procedure as in Examples A1 to A15 was taken to load the nickel hydroxide-based active material into the porous sintered nickel substrate.

Figure 2:
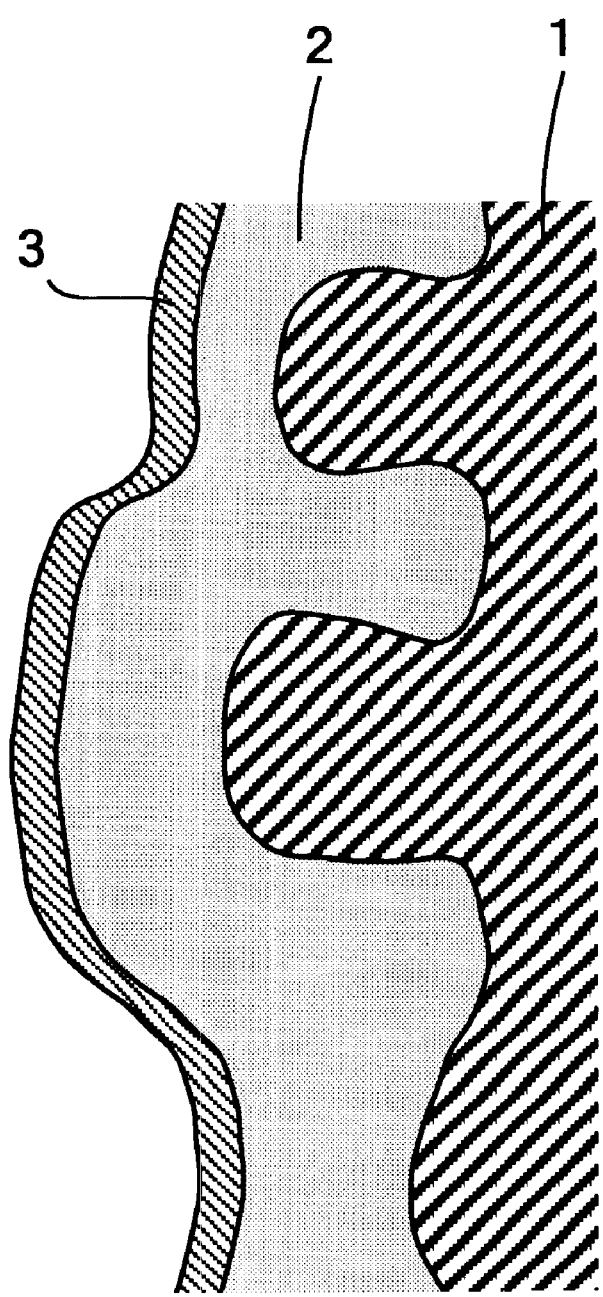
FIG. 2 is a schematic sectional view showing another exemplary nickel electrode for alkaline secondary battery according to the invention wherein a coating layer is laid on the surface portion of the active material loaded into the porous sintered nickel substrate.

Then, as shown in FIG. 2, the coating layer 3 of a complex hydroxide of nickel and an element selected from the group consisting of cobalt, calcium, strontium, scandium, yttrium, lanthanide, bismuth, magnesium and barium was laid on the nickel hydroxide-based active material 2 loaded into the sintered nickel substrate 1. Although the figure illustrates the coating layer 3 of the complex hydroxide of the aforesaid elements uniformly formed on the nickel hydroxide-based active material 2, it is to be noted that the active material layer 2 and the coating layer 3 each may be partially broken or may not be observed as a totally independent layer.

In formation of the coating layer of the above complex hydroxide on the active material loaded into the sintered nickel substrate, a solution mixture of nitrates of nickel (Ni) and each of the above elements was used. Specifically, there were used cobalt (Co) nitrate in Example B1; calcium (Ca) nitrate in Example B2; strontium (Sr) nitrate in Example B3; scandium (Sc) nitrate in Example B4; yttrium (Y) nitrate in Example B5; lanthanum (La) nitrate in Example B6; cerium (Ce) nitrate in Example B7; praseodymium (Pr) nitrate in Example B8; neodymium (Nd) nitrate in Example B9; europium (Eu) nitrate in Example B10; ytterbium (Yb) nitrate in Example B11; bismuth (Bi) nitrate in Example B12; magnesium (Mg) nitrate in Example B13; and barium (Ba) nitrate in Example B14.

There was prepared a 3 wt % nitrate aqueous solution containing nitrates of nickel and each of the above elements in the weight ratio of 1:1. The sintered nickel substrate loaded with the nickel hydroxide-based active material was dipped into the aqueous solution. Then, the substrate was dipped into the 25% NaOH aqueous solution at 80° C. and thus, each coating layer of the complex hydroxide of two elements, as listed in Table 7, was formed on the active material loaded into the sintered nickel substrate. The resultant coating layers substantially had a constant weight per unit area of 5 to 6 mg/cm² regardless of the different element types. Each complex hydroxide accounted for about 3 wt % based on the total weight of all the loaded materials of the coating layer and active material.

Alkaline secondary batteries of Examples B1 to B14 were fabricated using the respective nickel electrodes as the positive electrode therefor and the same procedure as in Examples A1 to A15.

COMPARATIVE EXAMPLE b1

Comparative Example b1 employed a nickel electrode with the sintered nickel substrate loaded with only the nickel hydroxide-based active material. An alkaline secondary battery was fabricated using this nickel electrode as the positive electrode therefor and the same procedure as in Examples A1 to A15.

COMPARATIVE EXAMPLE b2

In Comparative Example b2, a nickel electrode having a cobalt hydroxide layer laid on the nickel hydroxide-based active material was fabricated by the steps of loading the active material into the sintered nickel substrate; dipping the sintered nickel substrate into an aqueous solution of 3 wt % cobalt nitrate; dipping the substrate into an NaOH aqueous solution thereby allowing cobalt hydroxide to deposit onto the active material loaded into the sintered nickel substrate; and allowing the substrate to dry. An alkaline secondary battery of Comparative Example b2 was fabricated using the resultant nickel electrode as the positive electrode therefor and the same procedure as in Examples A1 to A15.

COMPARATIVE EXAMPLE b3

In Comparative Example b3, cobalt hydroxide was allowed to deposit onto the nickel hydroxide-based active material loaded into the sintered nickel substrate the same way as in Comparative Example b2. Then, the substrate wetted with the NaOH aqueous solution was heated at 80° C. in the atmosphere or in the presence of oxygen for oxidizing the above cobalt hydroxide. Thus was obtained a nickel electrode wherein a coating layer of oxidized cobalt hydroxide was formed on the active material. The resultant nickel electrode is equivalent to the nickel electrode for alkaline secondary battery disclosed in Japanese Unexamined Patent Publication No.1(1989)-200555.

An alkaline secondary battery of Comparative Example b3 was fabricated using this nickel electrode as the positive electrode therefor and the same procedure as in Examples A1 to A15.

COMPARATIVE EXAMPLES b4 to b16

In Comparative Examples b4 to b16, nickel electrodes were fabricated by the steps of loading the nickel hydroxide-based active material into the sintered nickel substrate and forming, on the active material, respective coating layers of hydroxides of different elements as listed in Table 8 as below.

The coating layers of hydroxides of different elements listed in Table 8 were each formed on the active material by the steps of preparing an aqueous solution containing 3 wt % nitrate of each of the elements; dipping the sintered nickel substrate loaded with the nickel hydroxide-based active material into the aqueous solution of nitrate of each element the same way as in Examples B1 to B14; and dipping the substrate into the 25% NaOH aqueous solution at 80° C.

Alkaline secondary batteries of Comparative Examples b4 to b16 were fabricated using the respective nickel electrodes as the positive electrode therefor and the same procedure as in Examples A1 to A15.

The resultant alkaline secondary batteries of Examples B1 to B14 and Comparative Examples b1 to b16 were cycled at room temperatures through 10 cycles with 16 hr charge using a 100 mA current and discharge to a voltage of 1.0 V using a 100 mA current.

On the 10th cycle, the discharge capacity $Q_{10}$ of each battery was determined. After the 11th charge cycle, the batteries were subject to storage at 50° C. for two weeks. Subsequently, the batteries were placed under room temperatures again and discharged at 100 mA to 1.0 V so as to determine the discharge capacity $Q_{11}$ at cycle 11. The high temperature storability was determined based on the following equation:

High-temperature storability(%)=$(Q_{11}/Q_{10}) \times 100$

The results are listed in Tables 7 and 8 as below.

Additionally, the alkaline secondary batteries were cycled through 10 charge/discharge cycles and charged at a high charge current of 1000 mA for 1.2 hours. Subsequently, the alkaline secondary batteries were discharged to 1.0 V at a high discharge current of 1000 mA so as to determine the discharge capacities of the batteries subjected to such a high current charge/discharge process. The results are listed as the high-rate discharge capacity in Tables 7 and 8 as below.

TABLE 7

|  | element of complex hydroxide in coating layer | high-temperature storability (%) | high-rate discharge capacity (mAh) |
| --- | --- | --- | --- |
| example B1 | Ni + Co | 66 | 1040 |
| example B2 | Ni + Ca | 66 | 1040 |
| example B3 | Ni + Sr | 61 | 990 |
| example B4 | Ni + Sc | 66 | 1050 |
| example B5 | Ni + Y | 70 | 1050 |
| example B6 | Ni + La | 62 | 990 |
| example B7 | Ni + Ce | 64 | 990 |
| example B8 | Ni + Pr | 61 | 990 |
| example B9 | Ni + Nd | 60 | 990 |
| example B10 | Ni + Eu | 63 | 990 |
| example B11 | Ni + Yb | 66 | 1010 |
| example B12 | Ni + Bi | 65 | 1040 |
| example B13 | Ni + Mg | 60 | 990 |
| example B14 | Ni + Ba | 60 | 990 |
| comparative example b1 | — | 49 | 890 |
| Comparative example b2 | Co | 52 | 960 |
| Comparative example b3 | Co (heat treatment) | 54 | 970 |

TABLE 8

|  | element of hydroxide in coating layer | high-temperature storability (%) | high-rate discharge capacity (mAh) |
| --- | --- | --- | --- |
| comparative example b4 | Ca | 64 | 940 |
| Comparative example b5 | Sr | 58 | 900 |
| Comparative example b6 | Sc | 64 | 900 |
| Comparative example b7 | Y | 66 | 950 |
| Comparative example b8 | La | 58 | 900 |
| Comparative example b9 | Ce | 62 | 900 |
| Comparative example b10 | Pr | 59 | 900 |
| Comparative example b11 | Nd | 58 | 900 |
| Comparative example b12 | Eu | 61 | 900 |
| Comparative example b13 | Yb | 63 | 920 |
| Comparative example b14 | Bi | 62 | 940 |
| Comparative example b15 | Mg | 57 | 930 |
| Comparative example b16 | Ba | 57 | 940 |

As apparent from Table 7, the alkaline secondary batteries of Examples B1 to B14 employing the nickel electrodes, wherein the coating layer of complex hydroxide of Ni and an element selected from the group of Co, Ca, Sr, Sc, Y, La, Ce, Pr, Nd, Eu, Yb, Bi, Mg and Ba is formed on the nickel hydroxide-based active material loaded into the sintered nickel substrate, accomplish notable improvement in the high temperature storability and increase in the high-rate discharge capacity, as compared with that of Comparative Example b1 employing the nickel electrode free from the coating layer, that of Comparative Example b2 employing the nickel electrode with the coating layer of cobalt hydroxide which is not heat treated, and that of Comparative Example b3 employing the nickel electrode with the coating layer of cobalt hydroxide which is heat treated.

As indicated by Tables 7 and 8, a significant difference of the high temperature storability is not found in the comparison between the batteries of Examples B1 to B14 and those of Comparative Examples b4 to b16 employing the nickel electrodes, wherein the coating layer of hydroxide of an element selected from the group of Ca, Sr, Sc, Y, La, Ce, Pr, Nd, Eu, Yb, Bi, Mg and Ba is formed on the nickel hydroxide-based active material loaded into the sintered nickel substrate. However, the batteries of Examples B1 to B14 present greater high-rate discharge capacities.

EXAMPLES B5.1 TO B5.9

In Examples B5.1 to B5.9, the nickel hydroxide-based active material was loaded into the sintered nickel substrate and similarly to Example B5, the aqueous solution containing nickel nitrate and yttrium nitrate in the weight ratio of 1:1 was used for forming respective coating layers on the active material.

Specifically, Examples B5.1 to B5.9 varied the combined weight percentage of nitrates of nickel (Ni) and yttrium (Y) in the aqueous nitrate solution within the range of 0.1 to 7 wt %. Using such aqueous nitrate solutions, the respective coating layers of complex hydroxides of nickel and yttrium were formed on the active material.

The weight percentage of the complex hydroxide of nickel and yttrium was determined for the respective coating layers based on the total weight of all the loaded materials of the coating layer and active material. The results are listed in Table 9 as below.

Alkaline secondary batteries of Examples B5.1 to B5.9 were fabricated using the respective nickel electrodes as the positive electrode therefor and the same procedure as in Examples A1 to A15.

The high temperature storability and high-rate discharge capacity were determined for the respective alkaline secondary batteries of these examples the same way as in Examples B1 to B14 and Comparative examples b1 to b16. The results along with that of Example B5 are listed in Table 9.

TABLE 9

| | complex hydroxide in coating layer | | high-temperature storability (%) | high-rate discharge capacity (mAh) |
|---|---|---|---|---|
| | element | weight percentage (wt %) | | |
| example B5.1 | Ni + Y | 0.1 | 59 | 1030 |
| example B5.2 | Ni + Y | 0.3 | 63 | 1030 |
| example B5.3 | Ni + Y | 0.5 | 67 | 1040 |
| example B5.4 | Ni + Y | 1 | 68 | 1040 |
| example B5.5 | Ni + Y | 2 | 69 | 1040 |
| example B5 | Ni + Y | 3 | 70 | 1050 |
| example B5.6 | Ni + Y | 4 | 70 | 1050 |
| example B5.7 | Ni + Y | 5 | 71 | 1040 |
| example B5.8 | Ni + Y | 6 | 71 | 1010 |
| example B5.9 | Ni + Y | 7 | 71 | 980 |

As apparent from this table, the high temperature storability and the high-rate discharge capacity are improved with the coating layer which is formed on the nickel hydroxide-based active material loaded into the sintered nickel substrate, and which contains the complex hydroxide of nickel and yttrium in the weight percentage of 0.5 to 5 wt % based on the total weight of all the loaded materials of the coating layer and active material. Although Examples B5, B5.1 to B5.9 cite the coating layers formed on the active material loaded into the sintered nickel substrate and based on the complex hydroxide of nickel and yttrium, substantially the same results may be attained by the coating layer of complex hydroxide of nickel and an element selected from the group consisting of cobalt, calcium, strontium, scandium, lanthanide, bismuth, magnesium and barium.

EXAMPLES B5.11 TO B5.19

In Examples B5.11 to B5.19, the nickel hydroxide-based active material was loaded into the sintered nickel substrate and similarly to Example B5, nickel (Ni) nitrate and yttrium (Y) nitrate were used for forming respective coating layers on the active material.

In these examples, there were prepared respective aqueous nitrate solutions containing nickel nitrate and yttrium nitrate in weight ratios listed in Table 10 as below and in the total weight percentage of 5 wt %. Using such aqueous nitrate solutions, the respective coating layers of the complex hydroxide of nickel and yttrium were formed on the active material. Table 10 lists the weight percentages of yttrium hydroxide in the resultant coating layers based on the total weight of all the loaded materials of the coating layer and active material.

Alkaline secondary batteries of Examples B5.11 to B5.19 were fabricated using the respective nickel electrodes as the positive electrode therefor and the same procedure as in Examples A1 to A15.

Similarly to Examples B1 to B14 and Comparative Examples b1 to b16, the high temperature storability and the high-rate discharge capacity were determined for the respective alkaline secondary batteries of these examples. The results along with that of Example B5.7 are listed in Table 10 as below.

TABLE 10

| | Ni nitrate: Y nitrate (weight percentage) | content of Y nitrate (wt %) | high-temperature storability (%) | high-rate discharge capacity (mAh) |
|---|---|---|---|---|
| example B5.11 | 9.77:0.23 | 0.1 | 61 | 1030 |
| example B5.12 | 9.55:0.45 | 0.2 | 65 | 1030 |
| example B5.13 | 9.38:0.62 | 0.3 | 69 | 1040 |
| example B5.14 | 7.8:2.2 | 1.0 | 70 | 1040 |
| example B5.15 | 6.1:3.9 | 1.8 | 71 | 1040 |
| example B5.7 | 1:1 | 2.3 | 71 | 1040 |
| example B5.16 | 4.3:5.7 | 2.7 | 71 | 1040 |
| example B5.17 | 3.7:6.3 | 3.0 | 72 | 1040 |
| example B5.18 | 3.3:6.7 | 3.2 | 72 | 1010 |
| example B5.19 | 2.9:7.1 | 3.4 | 72 | 980 |

As apparent from this table, the high temperature storability and the high-rate discharge capacity are improved with the coating layer which is formed from the complex hydroxide of nickel and yttrium on the active material loaded into the sintered nickel substrate, and which contains yttrium hydroxide in the weight percentage of 0.3 to 3 wt % based on the total weight of all the loaded materials of the coating layer and active material. Although Examples B5.7, B5.11 to B5.19 cite the coating layers formed on the active material loaded into the sintered nickel substrate and based on the complex hydroxide of nickel and yttrium, substantially the same results may be attained by the coating layer of complex hydroxide of nickel and an element selected from the group consisting of cobalt, calcium, strontium, scandium, lanthanide, bismuth, magnesium and barium.

EXAMPLES C1 TO C14

Examples C1 to C14 employed the sintered nickel substrate prepared the same way as in Examples A1 to A15.

Figure 3:
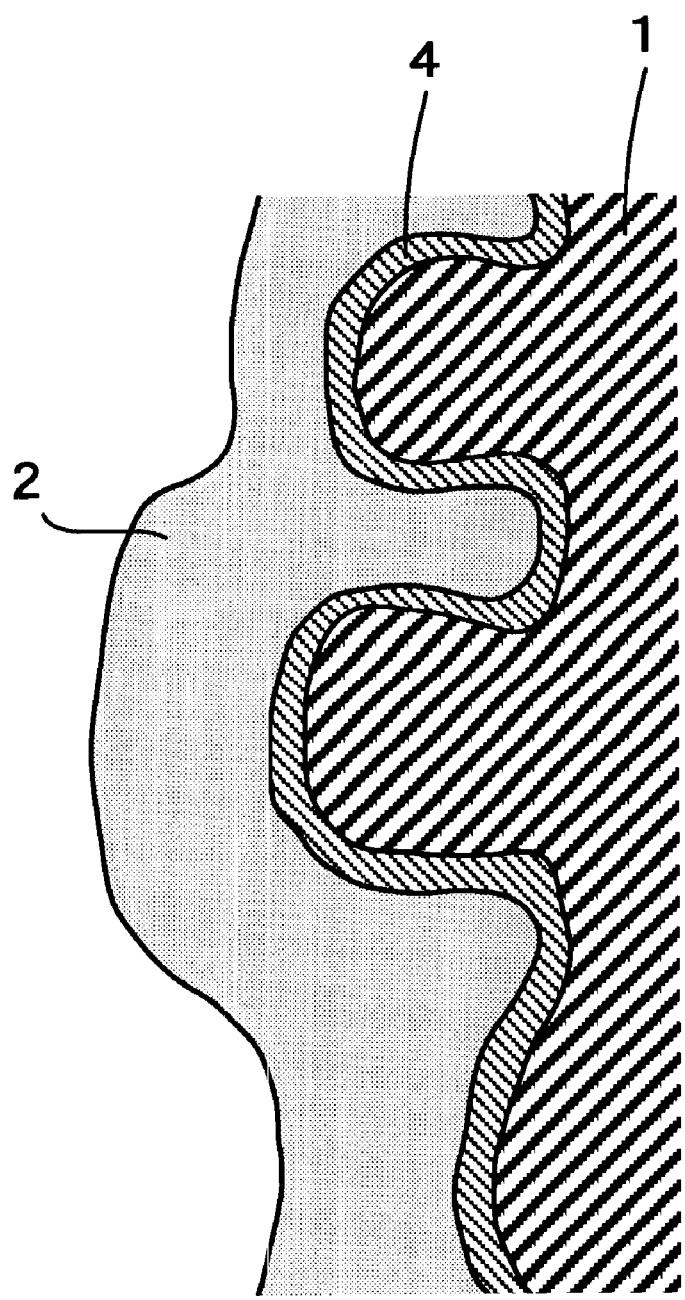
FIG. 3 is a schematic sectional view showing still another exemplary nickel electrode for alkaline secondary battery according to the invention wherein an intermediate layer is laid between the porous sintered nickel substrate and the active material.

As shown in FIG. 3, formed on the sintered nickel substrate 1 is an intermediate layer 4 based on a complex hydroxide of nickel and an element selected from the group consisting of cobalt, calcium, strontium, scandium, yttrium, lanthanide, bismuth, magnesium and barium. Then, the nickel hydroxide-based active material 3 was loaded into the sintered nickel substrate 1 formed with the intermediate layer 4. Although the figure illustrates the intermediate layer 4 and the active material layer 2 uniformly formed on the sintered nickel substrate 1, it is to be noted that the intermediate layer 4 and the active material layer 2 each may be partially broken or may not be observed as a totally independent layer.

The intermediate layer of the above complex hydroxide was formed on the sintered nickel substrate using a solution mixture containing nickel (Ni) nitrate and the nitrate of the above element. Specifically, there were used cobalt (Co) nitrate in Example C1; calcium (Ca) nitrate in Example C2; strontium (Sr) nitrate in Example C3; scandium (Sc) nitrate in Example C4; yttrium (Y) nitrate in Example C5; lanthanum (La) nitrate in Example C6; cerium (Ce) nitrate in Example C7; praseodymium (Pr) nitrate in Example C8; neodymium (Nd) nitrate in Example C9; europium (Eu) nitrate in Example C10; ytterbium (Yb) nitrate in Example C11; bismuth (Bi) nitrate in Example C12; magnesium (Mg) nitrate in Example C13; and barium (Ba) nitrate in Example C14.

There was prepared a 10 wt % nitrate aqueous solution containing nickel nitrate and the nitrate of each of the above elements in the weight ratio of 1:1. The sintered nickel substrate was dipped into each of the aqueous solutions and then dipped into the 25% NaOH aqueous solution at 80° C., thereby to form, on the sintered nickel substrate, each intermediate layer of the complex hydroxide of two elements as listed in Table 10. The presence of the respective intermediate layers was confirmed by X-ray diffraction analysis. The resultant intermediate layers of the complex hydroxides on the sintered nickel substrate substantially had a constant weight per unit area of 8 to 10 mg/cm$^2$.

Subsequently, the nickel hydroxide-based active material was loaded into the respective sintered nickel substrates formed with the intermediate layers using 6 impregnation cycles, where each impregnation cycle comprised the steps of dipping the sintered nickel substrate into an aqueous solution mixture of nickel nitrate and cobalt nitrate (specific gravity:175, atomic ratio between nickel and cobalt:10:1) for impregnation of the sintered nickel substrate with the solution mixture; and dipping the substrate into the 25% NaOH aqueous solution thereby allowing these hydroxides to deposit onto the sintered nickel substrate formed with the intermediate layer. Thus were fabricated respective nickel electrodes for alkaline secondary battery. Incidentally, each of the intermediate layers contained the complex hydroxide in concentrations of about 5 wt % based on the total weight of all the loaded materials of the active material and intermediate layer.

Alkaline secondary batteries of Examples C1 to C14 were fabricated using the respective nickel electrodes as the positive electrode therefor and the same procedure as in Examples A1 to A15.

COMPARATIVE EXAMPLE c1

Comparative Example c1 employed the sintered nickel substrate prepared the same way as in Examples A1 to A15. An intermediate layer was formed by the steps of dipping the sintered nickel substrate into an aqueous solution of 3 wt % cobalt nitrate; dipping the substrate into the NaOH aqueous solution thereby allowing cobalt hydroxide to deposit onto the sintered nickel substrate; and heating the substrate wetted with the NaOH aqueous solution at 80° C. in the atmosphere or in the presence of oxygen, thereby oxidizing the above cobalt hydroxide. Subsequently, the same procedure as in Examples C1 to C14 was taken to load the nickel hydroxide-based active material into the sintered nickel substrate formed with the intermediate layer. Thus was fabricated a nickel electrode for alkaline secondary battery. The resultant nickel electrode is equivalent to the nickel electrode for alkaline secondary battery disclosed in Japanese Unexamined Patent Publication No.63-216268.

An alkaline secondary battery of Comparative Example c1 was fabricated using the resultant nickel electrode as the positive electrode therefor and the same procedure as in Examples A1 to A15.

Similarly to Examples B1 to B14 and Comparative Examples b1 to b16, the high temperature storability and the high-rate discharge capacity were determined for the respective alkaline secondary batteries of Examples C1 to C14 and Comparative Example c1. The results are listed in Table 11.

TABLE 11

|  | element of complex hydroxide in intermediate layer | high-temperature storability (%) | high-rate discharge capacity (mAh) |
|---|---|---|---|
| example C1 | Ni + Co | 64 | 1020 |
| example C2 | Ni + Ca | 64 | 1020 |
| example C3 | Ni + Sr | 58 | 970 |
| example C4 | Ni + Sc | 64 | 1030 |
| example C5 | Ni + Y | 68 | 1030 |
| example C6 | Ni + La | 60 | 970 |
| example C7 | Ni + Ce | 61 | 970 |
| example C8 | Ni + Pr | 58 | 970 |
| example C9 | Ni + Nd | 58 | 970 |
| example C10 | Ni + Eu | 60 | 970 |
| example C11 | Ni + Yb | 64 | 990 |
| example C12 | Ni + Bi | 63 | 1020 |
| example C13 | Ni + Mg | 58 | 970 |
| example C14 | Ni + Ba | 57 | 970 |
| comparative example c1 | Co (heat treatment) | 51 | 940 |

As apparent from this table, the alkaline secondary batteries of Examples C1 to C14 employing the nickel electrodes, wherein the intermediate layer of the complex hydroxide of Ni and one element selected from the group of Co, Ca, Sr, Sc, Y, La, Ce, Pr, Nd, Eu, Yb, Bi, Mg and Ba is formed on the sintered nickel substrate and the nickel hydroxide-based active material is loaded into the sintered nickel substrate formed with the intermediate layer, accomplish notable improvement in the high temperature storability and greater high-rate discharge capacity, as compared with the battery of Comparative Example c1 employing the nickel electrode including the intermediate layer of the heat-treated cobalt hydroxide.

EXAMPLES C5.1 TO C5.9

Examples C5.1 to C5.9 employed the porous sintered nickel substrate prepared the same way as in Examples A1 to A15. Similarly to Example C5, intermediate layers were formed on the sintered nickel substrate using the aqueous nitrate solution containing nickel (Ni) nitrate and yttrium (Y) nitrate in the weight ratio of 1:1.

In Examples C5.1 to C5.9, the intermediate layers of the complex hydroxide of Ni and Y were each formed on the sintered nickel substrate using the aqueous nitrate solutions varied in the combined weight percentage of nickel nitrate and yttrium nitrate within the range of 0.2 to 14 wt %. Subsequently, the same procedure as in Examples C1 to C14 was taken to load the nickel hydroxide-based active material into the resultant intermediate layer and to fabricate respective nickel electrodes for alkaline secondary battery.

The weight percentage of the complex hydroxide of nickel (Ni) and yttrium (Y) was determined for the respective intermediate layers based on the total weight of all the loaded materials of the intermediate layer and active material. The results are listed in Table 12 as below.

Alkaline secondary batteries of Examples C5.1 to C5.9 were fabricated using the respective nickel electrodes as the positive electrode therefor and the same procedure as in Examples A1 to A15.

Similarly to Examples B1 to B14 and Comparative Examples b1 to b16, the high temperature storability and the high-rate discharge capacity were determined for the respec tive alkaline secondary batteries of these examples. The results along with that of Example C5 are listed in Table 12 as below.

TABLE 12

| | complex hydroxide in intermediate layer | | high-temperature storability (%) | high-rate discharge capacity (mAh) |
|---|---|---|---|---|
| | element | weight percentage (wt %) | | |
| example C5.1 | Ni + Y | 0.1 | 56 | 1030 |
| example C5.2 | Ni + Y | 0.3 | 60 | 1030 |
| example C5.3 | Ni + Y | 0.5 | 64 | 1040 |
| example C5.4 | Ni + Y | 1 | 65 | 1040 |
| example C5.5 | Ni + Y | 2 | 66 | 1040 |
| example C5.6 | Ni + Y | 3 | 66 | 1040 |
| example C5.7 | Ni + Y | 4 | 67 | 1040 |
| example C5 | Ni + Y | 5 | 68 | 1030 |
| example C5.8 | Ni + Y | 6 | 68 | 1010 |
| example C5.9 | Ni + Y | 7 | 68 | 980 |

As apparent from this table, the high temperature storability and the high-rate discharge capacity are improved with the intermediate layer which is formed between the sintered nickel substrate and the active material, and which contains the complex hydroxide of nickel and yttrium in the weight percentage of 0.5 to 5 wt % based on the total weight of all the loaded materials of the intermediate layer and active material. Although Examples C5, C5.1 to C5.9 cite the intermediate layers formed between the sintered nickel substrate and the active material and based on the complex hydroxide of nickel and yttrium, substantially the same results may be attained by the intermediate layer based on the complex hydroxide of nickel and an element selected from the group consisting of cobalt, calcium, strontium, scandium, lanthanide, bismuth, magnesium and barium.

EXAMPLES C5.11 TO C5.19

Examples C5.11 to C5.19 employed the porous sintered nickel substrate prepared the same way as in Examples A1 to A15. Similarly to Example C5, intermediate layers were formed on the sintered nickel substrate using nickel (Ni) nitrate and yttrium (Y) nitrate.

In Examples C5.11 to C5.19, the intermediate layers of the complex hydroxide of Ni and Y were each formed on the sintered nickel substrate using aqueous nitrate solutions varied in the weight ratio of nickel nitrate and yttrium nitrate as listed in Table 13 as below and containing these nitrates in 10 wt %. Subsequently, the same procedure as in Examples C1 to C14 was taken to load the nickel hydroxide-based active material into the sintered nickel substrate formed with the intermediate layer and to fabricate respective nickel electrodes for alkaline battery. The weight percentage of yttrium hydroxide was determined for the respective intermediate layers based on the total weight of all the loaded materials of the resultant intermediate layer and active material. The results are listed in Table 13 as below.

Alkaline secondary batteries of Examples C5.11 to C5.19 were fabricated using the respective nickel electrodes as the positive electrode therefor and the same procedure as in Examples A1 to A15.

Similarly to Examples B1 to B14 and Comparative Examples b1 to b16, the high temperature storability and the high-rate discharge capacity were determined for the respec tive alkaline secondary batteries of these examples. The results along with that of Example C5 are listed in Table 13 as below.

TABLE 13

| | Ni nitrate: Y nitrate (weight percentage | content of Y nitrate (wt %) | high-temperature storability (%) | high-rate discharge capacity (mAh) |
|---|---|---|---|---|
| example C5.11 | 9.77:0.23 | 0.1 | 57 | 1030 |
| example C5.12 | 9.55:0.45 | 0.2 | 62 | 1030 |
| example C5.13 | 9.38:0.62 | 0.3 | 66 | 1040 |
| example C5.14 | 7.8:2.2 | 1.0 | 67 | 1040 |
| example C5.15 | 6.1:3.9 | 1.8 | 68 | 1040 |
| example C5 | 1:1 | 2.3 | 68 | 1030 |
| example C5.16 | 4.3:5.7 | 2.7 | 68 | 1030 |
| example C5.17 | 3.7:6.3 | 3.0 | 69 | 1030 |
| example C5.18 | 3.3:6.7 | 3.2 | 69 | 1000 |
| example C5.19 | 2.9:7.1 | 3.4 | 69 | 970 |

As apparent from the table, the high temperature storability and the high-rate discharge capacity are improved with the intermediate layer which is formed from the complex hydroxide of nickel and yttrium between the sintered nickel substrate and the active material and which contains yttrium hydroxide in the weight percentage of 0.3 to 3 wt % based on the total weight of all the loaded materials of the intermediate layer and active material. Although Examples C5, C5.11 to C5.19 cite the intermediate layers formed between the sintered nickel substrate and the active material and based on the complex hydroxide of nickel and yttrium, substantially the same results may be attained by the intermediate layer based on the complex hydroxide of nickel and an element selected from the group consisting of cobalt, calcium, strontium, scandium, lanthanide, bismuth, magnesium and barium.

In the foregoing, Example B cites the coating layer which is formed on the surface portion of the active material on the porous sintered nickel substrate and which contains the complex hydroxide of nickel and cobalt or the like, whereas Example C cites the intermediate layer which is formed between the porous sintered nickel substrate and the active material and which contains the complex hydroxide of nickel and cobalt or the like. An alternative configuration may be made such that the intermediate layer based on the complex hydroxide of nickel and cobalt or the like is formed between the porous sintered nickel substrate and the active material, and the coating layer based on the complex hydroxide of nickel and cobalt or the like is formed on the surface portion of the active material on the sintered nickel substrate.

EXAMPLES D1 TO D13

In Examples D1 to D13, the same procedure as in Examples A1 to A15 was taken to load the nickel hydroxide-based active material into the porous sintered nickel substrate.

Then, as shown in FIG. 1, the first coating layer 3a and the second coating layer 3b were sequentially laid on the active material 2 loaded into the sintered nickel substrate 1. Although the figure illustrates the active material layer 2, first coating layer 3a and second coating layer 3b uniformly overlaid on one another on the sintered nickel substrate 1, it is to be noted that the active material layer 2, first coating layer 3a and second coating layer 3b each may be partially broken or may not be observed as a totally independent layer.

In formation of first coating layers on the active material loaded into the sintered nickel substrate, aqueous solutions of 3 wt % nitrate were prepared. Specifically, there were used magnesium (Mg) nitrate in Example D1; calcium (Ca) nitrate in Example D2; barium (Ba) nitrate in Example D3; strontium (Sr) nitrate in Example D4; scandium (Sc) nitrate in Example D5; yttrium (Y) nitrate in Example D6; lanthanum (La) nitrate in Example D7; cerium (Ce) nitrate in Example D8; praseodymium (Pr) nitrate in Example D9; neodymium (Nd) nitrate in Example D10; europium (Eu) nitrate in Example D11; ytterbium (Yb) nitrate in Example D12; and bismuth (Bi) nitrate in Example D13.

Next, the sintered nickel substrate loaded with the active material was dipped into each of the above aqueous nitrate solutions, and then dipped into the 25% NaOH aqueous solution at 80° C. Thus, the first coating layer of the hydroxide of each element listed in Table 14 as below was formed on the active material loaded into the sintered nickel substrate.

The second coating layer of cobalt hydroxide was formed on the respective first coating layers by the steps of dipping the sintered nickel substrate formed with the first coating layer into an aqueous solution of 3 wt % cobalt nitrate, and dipping the substrate into the 25% NaOH aqueous solution at 80° C. Thus were fabricated nickel electrodes for alkaline secondary battery of these examples.

Where the first coating layer based on the hydroxide of each of the above elements was formed on the active material in this manner, the respective first coating layers substantially had a constant weight per unit area of 5 to 6 mg/cm$^2$. Further, each first coating layer contained hydroxide of the above element in the weight percentage of 2.9 wt % based on the total weight of all the loaded materials of the first and second coating layers and active material, as shown in Table 14.

The second coating layers formed from cobalt hydroxide on the first coating layers substantially had a constant weight per unit area of 5 to 6 mg/cm$^2$. The second coating layers contained cobalt hydroxide in the weight percentage of 3.0 wt % based on the total weight of all the loaded materials of the first and second coating layers and active material, as shown in Table 14.

Alkaline secondary batteries of Examples D1 to D13 were fabricated using the respective nickel electrodes as the positive electrode therefor and the same procedure as in Examples A1 to A15.

COMPARATIVE EXAMPLE d1

Comparative example d1 employed a nickel electrode for alkaline secondary battery wherein only the nickel hydroxide-based active material was loaded into the porous sintered nickel substrate and the coating layer on the active material was dispensed with.

An alkaline secondary battery of Comparative Example d1 was fabricated using this nickel electrode as the positive electrode therefor and the same procedure as in Examples A1 to A15.

COMPARATIVE EXAMPLE d2

In Comparative Example d2, a nickel electrode with the first coating layer of cobalt hydroxide formed on the active material was fabricated using the same procedure as in Examples D1 to D13, the procedure comprising the steps of loading the nickel hydroxide-based active material into the sintered nickel substrate, dipping the substrate into the aqueous solution of 3 wt % cobalt nitrate, dipping the substrate into the NaOH aqueous solution thereby allowing cobalt hydroxide to deposit onto the active material loaded into the sintered nickel substrate, and allowing the substrate to dry. Incidentally, the first coating layer contained cobalt hydroxide in the weight percentage of about 3.1 wt % based on the total weight of all the loaded materials of the first coating layer and active material.

An alkaline secondary battery of Comparative Example d2 was fabricated using the resultant nickel electrode as the positive electrode therefor and the same procedure as in Examples A1 to A15.

COMPARATIVE EXAMPLES d3 to d15

In Comparative Examples d3 to d15, the nickel hydroxide-based active material was loaded into the sintered nickel substrate and then only the first coating layer based on the hydroxide of each element listed in Table 14 as below was formed on the active material.

The first coating layer of the hydroxide of each element listed in Table 14 was formed on the active material using the same procedure as in Examples D1 to D13, the procedure comprising the steps of preparing the aqueous solution of 3 wt % nitrate of each of the elements, dipping the sintered nickel substrate loaded with the active material into each of the aqueous nitrate solutions, and dipping the substrate into the 25% NaOH aqueous solution at 80° C. Thus were fabricated nickel electrodes of these comparative examples. The first coating layers each contained the hydroxide of each element in the weight percentage of about 3.0 wt % based on the total weight of all the loaded materials of the first coating layer and active material.

Alkaline secondary batteries of Comparative Examples d3 to d15 were fabricated using the respective nickel electrodes as the positive electrode therefor and the same procedure as in Examples A1 to A15.

The resultant alkaline secondary batteries of Examples D1 to D13 and Comparative Examples d1 to d15 were cycled at room temperatures through 10 cycles with 16 hr charge using a 100 mA current and discharge to a voltage of 1.0 V using a 200 mA current.

On the 10th cycle, the discharge capacity $Q_{10}$ of each battery was determined. After the 11th charge cycle, the batteries were subject to storage at 50° C. for two weeks. Subsequently, the batteries were placed under room temperatures again and discharged to 1.0 V so as to determine the discharge capacity $Q_{11}$ at cycle 11. The high temperature storability was determined based on the following equation:

$$\text{High-temperature storability}(\%) = (Q_{11}/Q_{10}) \times 100$$

The results are listed in Tables 14 and 15 as below.

Additionally, the alkaline secondary batteries were cycled through 10 charge/discharge cycles and then, charged at a high charge current of 1000 mA for 16 hours. Subsequently, the alkaline secondary batteries were discharged to 1.0 V at a high discharge current of 1000 mA so as to determine the battery voltage, as the working voltage, at midpoint of the period during which the voltage fell to the above cutoff voltage. The results are listed in Tables 14 and 15 as below.

TABLE 14

| | hydroxide in first coating layer | | weight percentage of cobalt hydroxide in second coating layer (wt %) | high-temperature storability (%) | working voltage (V) |
|---|---|---|---|---|---|
| | element | weight percentage (wt %) | | | |
| example D1 | Mg | 2.9 | 3.0 | 62 | 1.210 |
| example D2 | Ca | 2.9 | 3.0 | 71 | 1.212 |
| example D3 | Ba | 2.9 | 3.0 | 64 | 1.214 |
| example D4 | Sr | 2.9 | 3.0 | 64 | 1.211 |
| example D5 | Sc | 2.9 | 3.0 | 69 | 1.214 |
| example D6 | Y | 2.9 | 3.0 | 71 | 1.221 |
| example D7 | La | 2.9 | 3.0 | 64 | 1.216 |
| example D8 | Ce | 2.9 | 3.0 | 68 | 1.216 |
| example D9 | Pr | 2.9 | 3.0 | 62 | 1.214 |
| example D10 | Nd | 2.9 | 3.0 | 61 | 1.213 |
| example D11 | Eu | 2.9 | 3.0 | 67 | 1.211 |
| example D12 | Yb | 2.9 | 3.0 | 71 | 1.218 |
| example D13 | Bi | 2.9 | 3.0 | 70 | 1.216 |
| comparative example d1 | — | — | — | 49 | 1.200 |
| comparative example d2 | Co | 3.1 | — | 52 | 1.204 |

TABLE 15

| | hydroxide in first coating layer | | weight percentage of cobalt hydroxide in second coating layer (wt %) | high-temperature storability (%) | working voltage (V) |
|---|---|---|---|---|---|
| | element | weight percentage (wt %) | | | |
| comparative example d3 | Mg | 3.0 | — | 57 | 1.205 |
| Comparative example d4 | Ca | 3.0 | — | 64 | 1.205 |
| Comparative example d5 | Ba | 3.0 | — | 57 | 1.206 |
| Comparative example d6 | Sr | 3.0 | — | 58 | 1.205 |
| Comparative example d7 | Sc | 3.0 | — | 64 | 1.206 |
| Comparative example d8 | Y | 3.0 | — | 66 | 1.207 |
| Comparative example d9 | La | 3.0 | — | 58 | 1.207 |
| Comparative example d10 | Ce | 3.0 | — | 62 | 1.206 |
| Comparative example d11 | Pr | 3.0 | — | 59 | 1.205 |
| Comparative example d12 | Nd | 3.0 | — | 58 | 1.205 |
| Comparative example d13 | Eu | 3.0 | — | 61 | 1.205 |
| Comparative example d14 | Yb | 3.0 | — | 63 | 1.207 |
| Comparative example d15 | Bi | 3.0 | — | 62 | 1.207 |

As apparent from Table 14, the alkaline secondary batteries of Examples D1 to D13 employing the nickel electrodes, wherein the first coating layer of the hydroxide of an element selected from the group of Mg, Ca, Ba, Sr, Sc, Y, La, Ce, Pr, Nd, Eu, Yb and Bi is formed on the nickel hydroxide-based active material loaded into the sintered nickel substrate and the second coating layer of cobalt hydroxide is laid on the first coating layer, attain notable improvement in the high temperature storability and greater working voltages, as compared with that of Comparative Example d1 employing the nickel electrode without any layer on the active material, and that of Comparative Example d2 employing the nickel electrode including only the first coating layer of cobalt hydroxide on the active material.

As indicated by Tables 14 and 15, a significant difference of the high temperature storability is not found in the comparison between the batteries employing the nickel electrodes of Examples D1 to D13 and the batteries employing the nickel electrodes of Comparative Examples d3 to d15, wherein only the first coating layer of hydroxide of an element selected from the group of Mg, Ca, Ba, Sr, Sc, Y, La, Ce, Pr, Nd, Eu, Yb and Bi is formed on the nickel hydroxide-based active material loaded into the sintered nickel substrate. However, the batteries of Examples D1 to D13 present greater working voltages.

EXAMPLES D6.1 TO D6.9

In Examples D6.1 to D6.9, the nickel hydroxide-based active material was loaded into the sintered nickel substrate the same way as in Examples D1 to D13 and then, first coating layers were formed on the active material loaded into the sintered nickel substrate using similar aqueous solutions of yttrium (Y) nitrate to that used in Example D6.

In Examples D6.1 to D6.9, the aqueous solution of yttrium nitrate was varied in the concentration of yttrium nitrate within the range of 0.1 to 7.2 wt %. Using such aqueous solutions, the first coating layers varied in the concentration of yttrium hydroxide were formed on the active material. Subsequently, the same procedure as in Example D6 was taken to form the second coating layer of cobalt hydroxide on the respective first coating layers, thereby to fabricate nickel electrodes for alkaline secondary battery of these examples.

As to the resultant nickel electrodes for alkaline secondary battery, the weight percentages of yttrium hydroxide in the first coating layer and of cobalt hydroxide in the second coating layer were respectively determined based on the total weight of all the loaded materials of the first and second coating layers, and active material. The results are listed in Table 16 as below.

Alkaline secondary batteries of Examples D6.1 to D6.9 were fabricated using the respective nickel electrodes as the positive electrode therefor and the same procedure as in Examples A1 to A15.

Similarly to Examples D1 to D13 and Comparative examples d1 to d15, the high temperature storability and working voltage were determined for the respective alkaline secondary batteries of Examples D6.1 to D6.9. The results along with that of Example D6 are listed in Table 16 as below.

TABLE 16

| | hydroxide in first coating layer | | weight percentage of cobalt hydroxide in second coating layer (wt %) | high-temperature storability (%) | working voltage (V) |
|---|---|---|---|---|---|
| | element | weight percentage (wt %) | | | |
| example D6.1 | Y | 0.1 | 3.1 | 60 | 1.221 |
| example D6.2 | Y | 0.3 | 3.1 | 64 | 1.221 |

TABLE 16-continued

| | hydroxide in first coating layer | | weight percentage of cobalt hydroxide in second coating layer (wt %) | high-temperature storability (%) | working voltage (V) |
|---|---|---|---|---|---|
| | element | weight percentage (wt %) | | | |
| example D6.2 | Y | 0.5 | 3.1 | 67 | 1.222 |
| example D6.4 | Y | 1.0 | 3.1 | 68 | 1.222 |
| example D6.5 | Y | 2.0 | 3.0 | 69 | 1.222 |
| example D6 | Y | 2.9 | 3.0 | 71 | 1.221 |
| example D6.6 | Y | 4.0 | 3.0 | 72 | 1.220 |
| example D6.7 | Y | 5.0 | 2.9 | 72 | 1.219 |
| example D6.8 | Y | 6.0 | 2.9 | 72 | 1.216 |
| example D6.9 | Y | 7.0 | 2.9 | 72 | 1.212 |

As apparent from the table, the high temperature storability and the working voltage are improved with the combination of the first coating layer which is formed on the active material loaded into the sintered nickel substrate and contains yttrium hydroxide in the weight percentage of 0.5 to 5 wt % based on the total weight of all the loaded materials of the first and second coating layers and active material, and the second coating layer of cobalt hydroxide laid on the first coating layer. Although Examples D6, D6.1 to D6.9 cite the first coating layers of yttrium hydroxide formed on the active material loaded into the sintered nickel substrate, substantially the same results may be attained by the first coating layer based on the hydroxide of an element selected from the group consisting of Mg, Ca, Ba, Sr, Sc, La, Ce, Pr, Nd, Eu, Yb and Bi.

EXAMPLES D6.10 TO D6.18

In Examples D6.10 to D6.18, the nickel hydroxide-based active material was loaded into the sintered nickel substrate the same way as in Examples D1 to D13 and then, the first coating layer of yttrium hydroxide was formed on the active material loaded into the sintered nickel substrate the same way as in Example D6.

In Examples D6.10 to D6.18, the aqueous solution of cobalt nitrate was varied in the concentration of cobalt nitrate within the range of 0.1 to 7 wt %. Using such aqueous solutions, second coating layers varied in the concentration of cobalt hydroxide were each formed on the first coating layer. Thus were fabricated nickel electrodes for alkaline secondary battery of these examples.

As to the resultant nickel electrodes for alkaline secondary battery, the weight percentages of yttrium hydroxide in the first coating layer and of cobalt hydroxide in the second coating layer were respectively determined based on the total weight of all the loaded materials of the first and second coating layers, and active material. The results are listed in Table 17 as below.

Alkaline secondary batteries of Examples D6.10 to D6.18 were fabricated using the respective nickel electrodes as the positive electrode therefor and the same procedure as in Examples A1 to A15.

Similarly to Examples D1 to D13 and Comparative examples d1 to d15, the high temperature storability and the working voltage were determined for the respective alkaline secondary batteries of Examples D6.10 to D6.18. The results along with that of Example D6 are listed in Table 17 as below.

TABLE 17

| | hydroxide in first coating layer | | weight percentage of cobalt hydroxide in second coating layer (wt %) | high-temperature storability (%) | working voltage (V) |
|---|---|---|---|---|---|
| | element | weight percentage (wt %) | | | |
| example D6.10 | Y | 3.0 | 0.1 | 72 | 1.209 |
| example D6.11 | Y | 3.0 | 0.3 | 72 | 1.214 |
| example D6.12 | Y | 3.0 | 0.5 | 72 | 1.218 |
| example D6.13 | Y | 3.0 | 1.0 | 72 | 1.219 |
| example D6.14 | Y | 2.9 | 2.0 | 71 | 1.220 |
| example D6 | Y | 2.9 | 3.0 | 71 | 1.221 |
| example D6.15 | Y | 2.9 | 4.0 | 70 | 1.221 |
| example D6.16 | Y | 2.8 | 5.0 | 69 | 1.222 |
| example D6.17 | Y | 2.8 | 6.0 | 66 | 1.222 |
| example D6.18 | Y | 2.8 | 7.0 | 62 | 1.222 |

As apparent from the table, the high temperature storability and the working voltage are improved with the combination of the first coating layer of yttrium hydroxide formed on the active material loaded into the sintered nickel substrate, and the second coating layer of cobalt hydroxide which is laid on the first coating layer and contains cobalt hydroxide in the weight percentage of 0.5 to 5 wt % based on the total weight of all the loaded materials of the first and second coating layers, and active material. Although Examples D6, D6.1 to D6.9 cite the first coating layer formed from yttrium hydroxide on the active material loaded into the sintered nickel substrate, substantially the same results may be attained by the first coating layer based on the hydroxide of an element selected from the group consisting of Mg, Ca, Ba, Sr, Sc, La, Ce, Pr, Nd, Eu, Yb and Bi.

EXAMPLES E1 TO E13

In Examples E1 to E13, the same procedure as in Examples D1 to D13 was taken to load the nickel hydroxide-based active material into the sintered nickel substrate and then, to form, on the active material, first coating layers which are each based on a complex hydroxide of cobalt (Co) and an element selected from the group consisting of Mg, Ca, Ba, Sr, Sc, Y, La, Ce, Pr, Nd, Eu, Yb and Bi.

In formation of the first coating layer of the above complex hydroxide on the active material loaded into the sintered nickel substrate, a solution mixture of nitrates of cobalt (Co) and each of the above elements was used. Specifically, there were used magnesium (Mg) nitrate in Example E1; calcium (Ca) nitrate in Example E2; barium (Ba) nitrate in Example E3; strontium (Sr) nitrate in Example E4; scandium (Sc) nitrate in Example E5; yttrium (Y) nitrate in Example E6; lanthanum (La) nitrate in Example E7; cerium (Ce) nitrate in Example E8; praseodymium (Pr) nitrate in Example E9; neodymium (Nd) nitrate in Example E10; europium (Eu) nitrate in Example E11; ytterbium (Yb) nitrate in Example E12; and bismuth (Bi) nitrate in Example E13.

There were prepared 3 wt % nitrate aqueous solutions which each contained cobalt nitrate and the nitrate of the above element in the weight ratio of 1:1. The first coating layers each based on the complex hydroxide of two elements listed in Table 18 as below were formed on the active material by the steps of dipping the sintered nickel substrate into each of the above solutions, and dipping the substrate into the 25% NaOH aqueous solution at 80° C.

Subsequently, the same procedure as in Examples D1 to D13 was taken to form the second coating layer of cobalt hydroxide on the respective first coating layers. Thus were fabricated nickel electrodes for alkaline secondary battery of these examples.

The first coating layers contained the respective complex hydroxides in the weight percentage of 2.9 wt % based on the total weight of all the loaded materials of the first and second coating layers, and active material, as shown in Table 18. On the other hand, the second coating layer contained cobalt hydroxide in the weight percentage of 3.0 wt % as shown in Table 18.

Alkaline secondary batteries of Examples E1 to E13 were fabricated using the respective nickel electrodes as the positive electrode therefor and the same procedure as in Examples A1 to A15.

Similarly to Examples D1 to D13 and Comparative examples d1 to d15, the high temperature storability and the working voltage were determined for the respective alkaline secondary batteries of Examples E1 to E13. The results are listed in Table 18 as below.

TABLE 18

| | hydroxide in first coating layer | | weight percentage of cobalt hydroxide in second coating layer (wt %) | high-temperature storability (%) | working voltage (V) |
| --- | --- | --- | --- | --- | --- |
| | element | weight percentage (wt %) | | | |
| example E1 | Co + Mg | 2.9 | 3.0 | 64 | 1.220 |
| example E2 | Co + Ca | 2.9 | 3.0 | 73 | 1.222 |
| example E3 | Co + Ba | 2.9 | 3.0 | 65 | 1.224 |
| example E4 | Co + Sr | 2.9 | 3.0 | 67 | 1.221 |
| example E5 | Co + Sc | 2.9 | 3.0 | 70 | 1.224 |
| example E6 | Co + Y | 2.9 | 3.0 | 73 | 1.230 |
| example E7 | Co + La | 2.9 | 3.0 | 66 | 1.225 |
| example E8 | Co + Ce | 2.9 | 3.0 | 69 | 1.226 |
| example E9 | Co + Pr | 2.9 | 3.0 | 66 | 1.224 |
| example E10 | Co + Nd | 2.9 | 3.0 | 65 | 1.223 |
| example E11 | Co + Eu | 2.9 | 3.0 | 67 | 1.221 |
| example E12 | Co + Yb | 2.9 | 3.0 | 73 | 1.227 |
| example E13 | Co + Bi | 2.9 | 3.0 | 72 | 1.226 |

As apparent from this table, the alkaline secondary batteries of Examples E1 to E13 employing the nickel electrodes, wherein the first coating layer of complex hydroxide of Co and an element selected from the group of Mg, Ca, Ba, Sr, Sc, Y, La, Ce, Pr, Nd, Eu, Yb an d Bi is formed on the nickel hydroxide-based active material loaded into the sintered nickel substrate and the second coating layer of cobalt hydroxide is laid on the first coating layer, attain even greater improvement in the high temperature storability and greater working voltages as compared with those of Examples D1 to D13 including the first coating layer of hydroxide of an element selected from the group of Mg, Ca, Ba, Sr, Sc, Y, La, Ce, Pr, Nd, Eu, Yb and Bi and the second coating layer of cobalt. hydroxide.

EXAMPLES E6.1 TO E6.9

Similarly to Example E6, Examples E6.1 to E6.9 used the aqueous nitrate solution containing cobalt (Co) nitrate and yttrium (Y) nitrate in the weight ratio of 1:1 for forming first coating layers on the nickel hydroxide-based active material loaded into the sintered nickel substrate.

In Examples E6.1 to E6.9, the aqueous nitrate solution was varied in the combined weight percentage of cobalt nitrate and yttrium nitrate within the range of 0.1 to 7.2 wt %, so as to form, on the active material, the first coating layers varied in the concentration of complex hydroxide of cobalt and yttrium. Subsequently, the same procedure as in Example E6 was taken to form the second coating layer of cobalt hydroxide over the above first coating layer. Thus were fabricated nickel electrodes for alkaline secondary battery of these examples.

The weight percentages of the complex hydroxide of cobalt (Co) and yttrium (Y) in the first coating layer and of cobalt hydroxide in the second coating layer were respectively determined based on the total weight of all the loaded materials of the first and second coating layers and active material. The results are listed in Table 19 as below.

Alkaline secondary batteries of Examples E6.1 to E6.9 were fabricated using the respective nickel electrodes as the positive electrode therefor and the same procedure as in Examples A1 to A15.

Similarly to Examples D1 to D13 and Comparative examples d1 to d15, the high temperature storability and the working voltage were determined for the respective alkaline secondary batteries of Examples E6.1 to E6.9. The results along with that of Example E6 are listed in Table 19 as below.

TABLE 19

| | hydroxide in first coating layer | | weight percentage of cobalt hydroxide in second coating layer (wt %) | high-temperature storability (%) | working voltage (V) |
| --- | --- | --- | --- | --- | --- |
| | element | weight percentage (wt %) | | | |
| example E6.1 | Co + Y | 0.1 | 3.1 | 61 | 1.230 |
| example E6.2 | Co + Y | 0.3 | 3.1 | 66 | 1.230 |
| example E6.3 | Co + Y | 0.5 | 3.1 | 70 | 1.231 |
| example E6.4 | Co + Y | 1.0 | 3.1 | 71 | 1.231 |
| example E6.5 | Co + Y | 2.0 | 3.0 | 72 | 1.231 |
| example E6 | Co + Y | 2.9 | 3.0 | 73 | 1.230 |
| example E6.6 | Co + Y | 4.0 | 3.0 | 74 | 1.229 |
| example E6.7 | Co + Y | 5.0 | 2.9 | 74 | 1.228 |
| example E6.8 | Co + Y | 6.0 | 2.9 | 74 | 1.224 |
| example E6.9 | Co + Y | 7.0 | 2.9 | 74 | 1.219 |

As apparent from this table, the improvement in the high temperature storability and the great working voltage are attained with the combination of the first coating layer which is formed on the active material loaded into the sintered nickel substrate and contains the complex hydroxide of cobalt and yttrium in the weight percentage of 0.5 to 5 wt % based on the total weight of all the loaded materials loaded into the sintered nickel substrate and the second coating layer cobalt hydroxide on the first coating layer. Although Examples E6, E6.1 to E6.9 cite the first coating layers of complex hydroxide of cobalt and yttrium formed on the active material loaded into the sintered nickel substrate, substantially the same results may be attained by the first coating layer based on the complex hydroxide of cobalt (Co) and an element selected from the group consisting of Mg, Ca, Ba, Sr, Sc, La, Ce, Pr, Nd, Eu, Yb and Bi.

EXAMPLES E6.10 TO E6.18

In Examples E6.10 to E6.18, the same procedure as in Example E6 was taken to load the nickel hydroxide-based active material into the sintered nickel substrate and then to form, on the active material, the first coating layer of complex hydroxide of cobalt and yttrium.

In Examples E6.10 to E6.18, the aqueous solution of cobalt nitrate was varied the concentration of cobalt nitrate within the range of 0.1 to 7 wt %, so as to form, over the first coating layer, second coating layers varied in the concentration of cobalt hydroxide. Thus were fabricated nickel electrodes for alkaline secondary battery of these examples.

The weight percentages of the complex hydroxide of cobalt (Co) and yttrium m(Y) in the first coating layer and of cobalt hydroxide in the second coating layer were respectively determined based on the total weight of all the loaded materials of the first and second coating layers, and active material. The results are listed in Table 20 as below.

Alkaline secondary batteries of Examples E6.10 to E6.18 were fabricated using the respective nickel electrodes as the positive electrode therefor and the same procedure as in Examples A1 to A15.

Similarly to Examples D1 to D13 and Comparative examples d1 to d15, the high temperature storability and the working voltage were determined for the respective alkaline secondary batteries of Examples E6.10 to E6.18. The results along with that of Example E6 are listed in Table 20 as below.

TABLE 20

| | hydroxide in first coating layer | | weight percentage of cobalt hydroxide in second coating layer (wt %) | high-temperature storability (%) | working voltage (V) |
|---|---|---|---|---|---|
| | element | weight percentage (wt %) | | | |
| example E6.10 | Co + Y | 3.0 | 0.1 | 74 | 1.212 |
| example E6.11 | Co + Y | 3.0 | 0.3 | 74 | 1.214 |
| example E6.12 | Co + Y | 3.0 | 0.5 | 74 | 1.219 |
| example E6.13 | Co + Y | 3.0 | 1.0 | 73 | 1.221 |
| example E6.14 | Co + Y | 2.9 | 2.0 | 73 | 1.229 |
| example E6 | Co + Y | 2.9 | 3.0 | 73 | 1.230 |
| example E6.15 | Co + Y | 2.9 | 4.0 | 72 | 1.230 |
| example E6.16 | Co + Y | 2.8 | 5.0 | 71 | 1.231 |
| example E6.17 | Co + Y | 2.8 | 6.0 | 67 | 1.231 |
| example E6.18 | Co + Y | 2.8 | 7.0 | 62 | 1.231 |

As apparent from this table, the improvement in the high temperature storability and the great working voltage are attained with the combination of the first coating layer of complex hydroxide of cobalt and yttrium laid on the active material loaded into the sintered nickel substrate, and the second coating layer which is formed over the first coating layer and contains cobalt hydroxide in the weight percentage of 0.5 to 5 wt % based on the total weight of all the loaded materials loaded into the sintered nickel substrate. Although Examples E6, E6.10 to E6.18 cite the first coating layers of complex hydroxide of cobalt and yttrium laid on the active material loaded into the sintered nickel substrate, substantially the same results may be attained by the first coating layer based on the complex hydroxide of cobalt (Co) and an element selected from the group consisting of Mg, Ca, Ba, Sr, Sc, La, Ce, Pr, Nd, Eu, Yb and Bi.

EXAMPLES F1 TO F10

In Examples F1 to F10, the same procedure as in Examples A1 to A15 was taken to load the nickel hydroxide-based active material into the sintered nickel substrate.

As shown in FIG. 2, the coating layer 3 based on the complex hydroxide of an element selected from the group of cobalt and nickel and an element selected from the group of manganese, aluminum, iron, copper and silver was formed on the nickel hydroxide-based active material 2 loaded into the sintered nickel substrate 1.

Preparatory to the formation of the coating layers of the above complex hydroxides on the active material loaded into the sintered nickel substrate, aqueous nitrate solutions were prepared which each contained nitrates of two of the above elements in the weight ratio of 1:1 and in the combined weight percentage of 3 wt %. Specifically, nitrates of cobalt and manganese were used in Example F1; nitrates of cobalt and aluminum in Example F2; nitrates of cobalt and iron in Example F3; nitrates of cobalt and copper in Example F4; nitrates of cobalt and silver in Example F5; nitrates of nickel and manganese in Example F6; nitrates of nickel and aluminum in Example F7; nitrates of nickel and iron in Example F8; nitrates of nickel and copper in Example F9; and nitrates of nickel and silver in Example F10.

The coating layer based on the complex hydroxide of two elements listed in Table 21 as below was formed by the steps of dipping the sintered nickel substrate with the nickel hydroxide-based active material into each of the above aqueous nitrate solutions, and dipping the substrate into the 25% NaOH aqueous solution at 80° C. Thus were fabricated nickel electrodes for alkaline secondary battery of these examples. The coating layers thus formed from the above complex hydroxides on the active material substantially had a constant weight per unit area of 5 to 6 $mg/cm^2$. The coating layers each contained the complex hydroxide in concentrations of about 3 wt % based on the total weight of all the loaded materials of the coating layer and active material.

Alkaline secondary batteries of Examples F1 to F10 were fabricated using the respective nickel electrodes as the positive electrode therefor and the same procedure as in Examples A1 to A15.

COMPARATIVE EXAMPLE f1

Comparative example f1 employed the nickel electrode for alkaline secondary battery wherein only the nickel hydroxide-based active material was loaded into the porous sintered nickel substrate and the coating layer on the active material was dispensed with.

An alkaline secondary battery of Comparative Example f1 was fabricated using this nickel electrode as the positive electrode therefor and the same procedure as in Examples A1 to A15.

COMPARATIVE EXAMPLE f2

In Comparative Example f2, a coating layer of manganese hydroxide was formed on the active material by the steps of loading the nickel hydroxide-based active material into the sintered nickel substrate, dipping the nickel substrate into an aqueous solution of 3 wt % manganese nitrate, and dipping the substrate into the 25% NaOH aqueous solution at 80° C. Thus was fabricated a nickel electrode with the coating layer of manganese hydroxide. The resultant coating layer contained manganese hydroxide in the weight percentage of about 3 wt % based on the total weight of all the loaded materials of the coating layer and active material. The nickel electrode thus fabricated is equivalent to the nickel electrode for alkaline secondary battery disclosed in Japanese Unexamined Patent Publication No.5(1993)-121073.

An alkaline secondary battery of Comparative Example f2 was fabricated using the resultant nickel electrode as the positive electrode therefor and the same procedure as in Examples A1 to A15.

The alkaline secondary batteries of Examples F1 to F10 and Comparative Examples f1 and f2 were cycled at room temperatures through 10 cycles with 16 hr charge using a 100 mA current and discharge to a voltage of 1.0 V using a 200 mA current.

Then, the alkaline secondary batteries cycled through 10 charge/discharge cycles at room temperatures were charged at the charge current of 100 mA for 16 hours. Subsequently, the batteries were discharged to 1.0 V at a high discharge current of 1000 mA so as to determine the battery voltage, as the working voltage, at midpoint of period during which the voltage fell to the above cutoff voltage. The results are listed in Table 21 as below.

The discharge capacity $Q_{10}$ at cycle 10 was determined for the respective alkaline secondary batteries cycled through 10 charge/discharge cycles at room temperatures. The same alkaline secondary batteries were subjected to the 16 hr charge on the 11th cycle using the 100 mA charge current and then, to storage at 50° C. for two weeks. Subsequently, the batteries were placed under room temperatures again and discharged at 200 mA to 1.0 V so as to determine the respective discharge capacities $Q_{11}$ at cycle 11. The high temperature storability was determined based on the following equation:

High-temperature storability(%)=$(Q_{11}/Q_{10})\times 100$

The results are listed in Table 21 as below.

The batteries cycled through 10 charge/discharge cycles at room temperatures were further cycled with 1.6 hr charge using the 1000 mA charge current and discharge to 1.0 V using the 1000 mA discharge current, so as to determine a number of cycles until the discharge capacity of each battery fell to 80% of the discharge capacity $Q_{10}$ at cycle 10. The number of cycles thus determined is listed in Table 21 as the cycle characteristics.

TABLE 21

| | element of hydroxide in coating layer | working voltage (V) | high-temperature storability (%) | cycle characteristic (number of cycles) |
|---|---|---|---|---|
| example F1 | Co + Mn | 1.220 | 70 | 1000 |
| example F2 | Co + Al | 1.218 | 68 | 900 |
| example F3 | Co + Fe | 1.218 | 67 | 900 |
| example F4 | Co + Cu | 1.217 | 68 | 950 |
| example F5 | Co + Ag | 1.216 | 66 | 880 |
| example F6 | Ni + Mn | 1.218 | 68 | 1050 |
| example F7 | Ni + Al | 1.216 | 66 | 880 |
| example F8 | Ni + Fe | 1.215 | 65 | 870 |
| example F9 | Ni + Cu | 1.215 | 66 | 930 |
| example F10 | Ni + Ag | 1.214 | 64 | 870 |
| comparative example f1 | — | 1.200 | 49 | 500 |
| comparative example f2 | Mn | 1.190 | 58 | 600 |

As apparent from this table, the alkaline secondary batteries of Examples F1 to F10 employing the nickel electrodes, wherein the coating layer of complex hydroxide of an element selected from the group of cobalt and nickel and an element selected from the group of manganese, aluminum, iron, copper and silver is laid on the surface portion of the nickel hydroxide-based active material, attain such great working voltages as to permit high voltage discharge and the improvement in the high temperature storability and cycle characteristics, as compared with that of Comparative Example f1 employing the nickel electrode free from the coating layer on the active material and that of Comparative Example f2 employing the nickel electrode with the coating layer of manganese hydroxide on the active material.

EXAMPLES F6.1 TO F6.9

In Examples F6.1 to F6.9, the nickel hydroxide-based active material was first loaded into the sintered nickel substrate. Then, similarly to Example F6, the coating layer based on the complex hydroxide of nickel and manganese was formed using the aqueous nitrate solution containing nickel nitrate and manganese nitrate in the weight ratio of 1:1.

In these examples, the aqueous nitrate solution was varied in the combined weight percentage (W1) of nitrates of nickel and manganese within the range of 0.1 to 7 wt % as listed in Table 22 as below. Using such aqueous nitrate solutions, the respective coating layers were formed which contained the complex hydroxide in weight percentages (W2) of 0.1 to 7 wt % based on the total weight of all the loaded materials of the coating layer and active material, as listed in Table 22 as below. Thus were fabricated nickel electrodes for alkaline secondary battery of these examples.

Alkaline secondary batteries of Examples F6.1 to F6.9 were fabricated using the respective nickel electrodes as the positive electrode therefor and the same procedure as in Examples A1 to A15.

Similarly to Examples F1 to F10 and Comparative examples f1 and f2, the working voltage, the high temperature storability and the cycle characteristics were determined for the respective alkaline secondary batteries of Examples F6.1 to F6.9. The results along with that of Example F6 are listed in Table 22 as below.

TABLE 22

| | W1 (wt %) | W2 (wt %) | working voltage (V) | high-temperature storability (%) | cycle characteristic (number of cycles) |
|---|---|---|---|---|---|
| example F6.1 | 0.1 | 0.1 | 1.217 | 61 | 800 |
| example F6.2 | 0.3 | 0.3 | 1.217 | 64 | 900 |
| example F6.3 | 0.5 | 0.5 | 1.218 | 67 | 950 |
| example F6.4 | 1 | 1 | 1.218 | 67 | 1000 |
| example F6.5 | 2 | 2 | 1.218 | 67 | 1050 |
| example F6 | 3 | 3 | 1.218 | 68 | 1050 |
| example F6.6 | 4 | 4 | 1.218 | 68 | 1050 |
| example F6.7 | 5 | 5 | 1.217 | 68 | 1050 |
| example F6.8 | 6 | 6 | 1.214 | 68 | 1000 |
| example F6.9 | 7 | 7 | 1.210 | 68 | 1000 |

According to comparison among the alkaline secondary batteries of Examples F6, F6.1 to F6.9 with reference to this table, the batteries of Examples F6, and F6.3 to F6.7, which include the coating layers containing the complex hydroxide of nickel and manganese in the weight percentages (W2) of 0.5 to 5 wt % based on the total weight of all the loaded materials of the coating layer and active material, attain greater working voltages permitting the high voltage discharge than those of Examples F6.8 and F6.9 with the above weight percentages (W2) in excess of 5 wt %. In addition, the batteries of Examples F6 and F6.3 to F6.7 attain greater improvement in the high temperature storability and cycle characteristics than those of Examples F6.1 and F6.2 with the above weight percentages (W2) less than 0.5 wt %.

Although Examples F6.1 to F6.9 cite the coating layers of complex hydroxide of nickel and manganese formed on the active material loaded into the sintered nickel substrate, substantially the same results may be attained by the coating layer based on the complex hydroxide of nickel and at least one element selected from the group consisting of aluminum, iron, copper and silver or on the complex hydroxide of cobalt and at least one element selected from the group consisting of manganese, aluminum, iron, copper and silver.

EXAMPLES F6.7.1 TO F6.7.9

In Examples F6.7.1 to F6.7.9, the nickel hydroxide-based active material was first loaded into the sintered nickel substrate. Then, similarly to Example F6.7, coating layers based on the complex hydroxide of nickel and manganese were formed using the aqueous nitrate solution containing nickel nitrate and manganese nitrate in the combined weight percentage (W1) of 5 wt %.

In these examples, the above aqueous nitrate solution was varied in the weight ratio (Ni:Mn) between nickel nitrate and manganese nitrate within the range of 9.8–3.1:0.2–6.9 as listed in Table 23 as below, so as to form the respective coating layers containing manganese hydroxide in weight percentages (W3) of 0.1 to 3.4 wt % as listed in Table 23 as below. Thus were fabricated nickel electrodes for alkaline secondary battery of these examples.

Alkaline secondary batteries of Examples F6.7.1 to F6.7.9 were fabricated using the respective nickel electrodes as the positive electrode therefor and the same procedure as in Examples A1 to A15.

Similarly to Examples F1 to F10 and Comparative examples f1 and f2, the working voltage, the high temperature storability and the cycle characteristics were determined for the respective alkaline secondary batteries of Examples F6.7.1 to E6.7.9. The results along with that of Example F6.7 are listed in Table 23 as below.

TABLE 23

| | Ni:Mn | W3 (wt %) | working voltage (V) | high-temperature storability (%) | cycle characteristic (number of cycles) |
|---|---|---|---|---|---|
| example F6.7.1 | 9.8:0.2 | 0.1 | 1.218 | 60 | 820 |
| example F6.7.2 | 9.6:0.4 | 0.2 | 1.218 | 63 | 910 |
| example F6.7.3 | 9.3:0.7 | 0.3 | 1.218 | 66 | 960 |
| example F6.7.4 | 8:2 | 1.0 | 1.218 | 67 | 1010 |
| example F6.7.5 | 7:3 | 1.5 | 1.217 | 67 | 1050 |
| example F6.7.6 | 6:4 | 2.0 | 1.217 | 68 | 1050 |
| example F6.7 | 1:1 | 2.5 | 1.217 | 68 | 1050 |
| example F6.7.7 | 4:6 | 3.0 | 1.217 | 68 | 1050 |
| example F6.7.8 | 3.5:6.5 | 3.2 | 1.214 | 68 | 1000 |
| example F6.7.9 | 3.1:6.9 | 3.4 | 1.210 | 68 | 1000 |

According to comparison among the alkaline secondary batteries of Examples F6.7, F6.7.1 to F6.7.9 with reference to this table, the batteries of Examples F6.7, and F6.7.3 to F6.7.7, which include the coating layers containing manganese hydroxide in the weight percentages (W3) of 0.3 to 3 wt % based on the total weight of all the loaded materials of the coating layer and active material, attain greater working voltages permitting the high voltage discharge than those of Examples F6.7.8 and F6.7.9 with the above weight percentages (W3) in excess of 3 wt %. In addition, the batteries of Examples F6.7, and F6.7.3 to F6.7.7 attain greater improvement in the high temperature storability and cycle characteristics than those of Examples F6.7.1 and F6.7.2 with the above weight percentages (W2) less than 0.3 wt %.

Although Examples F6.7.1 to F6.7.9 cite the coating layer of complex hydroxide of nickel and manganese formed on the active material loaded into the sintered nickel substrate, substantially the same results may be attained by the coating layer based on the complex hydroxide of nickel and at least one element selected from the group consisting of aluminum, iron, copper and silver or on the complex hydroxide of cobalt and at least one element selected from the group consisting of manganese, aluminum, iron, copper and silver.

EXAMPLES G1 TO G10

Examples G1 to G10 employed the porous sintered nickel substrate prepared the same way as in Examples A1 to A15.

In these examples, the intermediate layer 4 based on the complex hydroxide of two elements listed in Table 24 as below was formed on the sintered nickel substrate 1 and then, the nickel hydroxide-based active material 2 was loaded into the sintered nickel substrate 1 with the intermediate layer 4, as shown in FIG. 3.

Preparatory to the formation of intermediate layers of complex hydroxides of two elements listed in Table 24 on the sintered nickel substrate, aqueous nitrate solutions were prepared which each contained nitrates of two of the above elements in the weight ratio of 1:1 and in the combined weight percentage of 10 wt %. Specifically, nitrates of cobalt and manganese were used in Example G1; nitrates of cobalt and aluminum in Example G2; nitrates of cobalt and iron in Example G3; nitrates of cobalt and copper in Example G4; nitrates of cobalt and silver in Example G5; nitrates of nickel and manganese in Example G6; nitrates of nickel and aluminum in Example G7; nitrates of nickel and iron in Example G8; nitrates of nickel and copper in Example G9; and nitrates of nickel and silver in Example G10.

The intermediate layer of the complex hydroxide of two elements listed in Table 24 was formed on the sintered nickel substrate by the steps of dipping the sintered nickel substrate into each of the above aqueous nitrate solutions, and dipping the substrate into the 25% NaOH aqueous solution at 80° C.

The nickel hydroxide-based active material was loaded into the sintered nickel substrate formed with the intermediate layer using multiple impregnation cycles where each cycle comprised the steps of dipping the above sintered nickel substrate into an aqueous solution mixture of nickel nitrate and cobalt nitrate for impregnating g the aqueous solution mixture of nickel nitrate and manganese nitrate into the substrate with the intermediate layer; and dipping this substrate into the 25% NaOH aqueous solution thereby allowing hydroxides of these elements to deposit onto the sintered nickel substrate with the intermediate layer. Thus were fabricated nickel electrodes for alkaline secondary battery of these examples. The resultant intermediate layers all contained the complex hydroxide in the weight percentage of about 5 wt % based on the total weight of all the loaded materials of the intermediate layer and active material.

Alkaline secondary batteries of Examples G1 to G10 were fabricated using the respective nickel electrodes as the positive electrode therefor and the same procedure as in Examples A1 to A15.

Similarly to Examples F1 to F10 and Comparative examples f1 and f2, the working voltage, the high temperature storability and the cycle characteristics were determined for the respective alkaline secondary batteries of Examples G1 to G10. The results are listed in Table 24 as below.

TABLE 24

| | element of hydroxide in intermediate layer | working voltage (V) | high-temperature storability (%) | cycle characteristic (number of cycles) |
|---|---|---|---|---|
| example G1 | Co + Mn | 1.218 | 68 | 950 |
| example G2 | Co + Al | 1.215 | 66 | 850 |
| example G3 | Co + Fe | 1.216 | 65 | 850 |
| example G4 | Co + Cu | 1.215 | 66 | 900 |
| example G5 | Co + Ag | 1.214 | 64 | 820 |
| example G6 | Ni + Mn | 1.216 | 66 | 1000 |
| example G7 | Ni + Al | 1.213 | 64 | 830 |
| example G8 | Ni + Fe | 1.214 | 63 | 820 |
| example G9 | Ni + Cu | 1.213 | 64 | 880 |
| example G10 | Ni + Ag | 1.212 | 62 | 820 |

As apparent from this table, the alkaline secondary batteries of Examples G1 to G10 employing the nickel electrodes, which include the intermediate layer based on the complex hydroxide of nickel and an element selected from the group of manganese, aluminum, iron, copper and silver and formed between the sintered nickel substrate and the nickel hydroxide-based active material, attain greater working voltages permitting the high voltage discharge as compared with that of Comparative Example f1. Besides, the batteries of these examples are also improved in the high temperature storability and cycle characteristics.

EXAMPLES G6.1 TO G6.9

Similarly to Example G6, Examples G6.1 to G6.9 used the aqueous nitrate solution containing nickel nitrate and manganese nitrate in the weight ratio of 1:1 for forming intermediate layers on the porous sintered nickel substrate.

In these examples, the above aqueous nitrate solution was varied in the combined weight percentage (W4) of nitrates of nickel and manganese within the range of 0.2 to 14 wt % as listed in Table 25 as below, so as to form intermediate layers containing the complex hydroxide in weight percentages (W5) of 0.1 to 7 wt % based on the total weight of all the loaded materials of the intermediate layer and active material, as listed in the table. Subsequently, the nickel hydroxide-based active material was loaded into the sintered nickel electrodes with the intermediate layers the same way as in Examples G1 to G10, thereby fabricating nickel electrodes for alkaline secondary battery of these examples.

Alkaline secondary batteries of Examples G6.1 to G6.9 were fabricated using the respective nickel electrodes as the positive electrode therefor and the same procedure as in Examples A1 to A15.

Similarly to Examples F1 to F10 and Comparative examples f1 and f2, the working voltage, the high temperature storability and the cycle characteristics were determined for the respective alkaline secondary batteries of Examples G6.1 to G6.9. The results along with that of Example G6 are listed in Table 25 as below.

TABLE 25

| | W4 (wt %) | W5 (wt %) | working voltage (V) | high-temperature storability (%) | cycle characteristic (number of cycles) |
|---|---|---|---|---|---|
| example G6.1 | 0.2 | 0.1 | 1.216 | 59 | 750 |
| example G6.2 | 0.6 | 0.3 | 1.216 | 62 | 850 |
| example G6.3 | 1 | 0.5 | 1.217 | 65 | 900 |
| example G6.4 | 2 | 1 | 1.217 | 65 | 950 |
| example G6.5 | 4 | 2 | 1.217 | 65 | 1000 |
| example G6.6 | 6 | 3 | 1.217 | 66 | 1000 |
| example G6.7 | 8 | 4 | 1.217 | 66 | 1000 |
| example G6 | 10 | 5 | 1.216 | 66 | 1000 |
| example G6.8 | 12 | 6 | 1.213 | 66 | 950 |
| example G6.9 | 14 | 7 | 1.209 | 66 | 950 |

According to comparison among the alkaline secondary batteries of Examples G6, G6.1 to G6.9 with reference to this table, the batteries of Examples G6, and G6.3 to G6.7, which include the intermediate layers containing the complex hydroxide of nickel and manganese in the weight percentages (W5) of 0.5 to 5 wt % based on the total weight of all the loaded materials of the intermediate layer and active material, attain greater working voltages permitting the high voltage discharge than those of Examples G6.8 and G6.9 with the above weight percentages (W5) in excess of 5 wt %. In addition, the batteries of Examples G6, and G6.3 to G6.7 attain greater improvement in the high temperature storability and cycle characteristics than those of Examples G6.1 and G6.2 with the above weight percentages (W5) less than 0.5 wt %.

Although Examples G6.1 to G6.9 cite the intermediate layers of complex hydroxide of nickel and manganese formed between the sintered nickel substrate and the active material, substantially similar results may be attained by the intermediate layer based on the complex hydroxide of nickel and at least one element selected from the group consisting of aluminum, iron, copper and silver or on the complex hydroxide of cobalt and at least one element selected from the group consisting of manganese, aluminum, iron, copper and silver.

EXAMPLES G6.10 TO G6.18

Similarly to Example G6.7, Examples G6.10 to G6.18 used the aqueous nitrate solution containing nickel nitrate and manganese nitrate in the combined weight percentage (W4) of 10 wt % for forming intermediate layers based on the complex hydroxide of nickel and manganese.

In these examples, this aqueous nitrate solution was varied in the weight ratio (Ni:Mn) between nickel nitrate and manganese nitrate within the range of 9.8–3.1:0.2–6.9 as listed in Table 26 as below, so as to form the intermediate layers containing manganese hydroxide in weight percentages (W6) of 0.1 to 3.4 wt % based on the total weight of all the loaded materials of the intermediate layer and active material. Thus were fabricated nickel electrodes for alkaline secondary battery of these examples.

Alkaline secondary batteries of Examples G6.10 to G6.18 were fabricated using the respective nickel electrodes as the positive electrode therefor and the same procedure as in Examples A1 to A15.

Similarly to Examples F1 to F10 and Comparative examples f1 and f2, the working voltage, the high temperature storability and the cycle characteristics were determined for the respective alkaline secondary batteries of Examples G6.10 to G6.18. The results along with that of Example G6 are listed in Table 26 as below.

TABLE 26

| | Ni:Mn | W6 (wt %) | working voltage (V) | high-temperature storability (%) | cycle characteristic (number of cycles) |
|---|---|---|---|---|---|
| example G6.10 | 9.8:0.2 | 0.1 | 1.216 | 59 | 770 |
| example G6.11 | 9.6:0.4 | 0.2 | 1.216 | 62 | 860 |
| example G6.12 | 9.3:0.7 | 0.3 | 1.217 | 65 | 910 |
| example G6.13 | 8:2 | 1.0 | 1.217 | 65 | 960 |
| example G6.14 | 7:3 | 1.5 | 1.216 | 65 | 1000 |
| example G6.15 | 6:4 | 2.0 | 1.216 | 66 | 1000 |
| example G6 | 1:1 | 2.5 | 1.216 | 66 | 1000 |
| example G6.16 | 4:6 | 3.0 | 1.216 | 66 | 1000 |
| example G6.17 | 3.5:6.5 | 3.2 | 1.213 | 66 | 950 |
| example G6.18 | 3.1:6.9 | 3.4 | 1.208 | 66 | 950 |

According to comparison among the alkaline secondary batteries of Examples G6, G6.10 to G6.18 with reference to this table, the batteries of Examples G6, and G6.12 to G6.16, which include the intermediate layers containing the manganese hydroxide in the weight percentages (W6) of 0.3 to 3 wt % based on the total weight of all the loaded materials of the intermediate layer and active material, attain greater working voltages permitting the high voltage discharge than those of Examples G6.17 and G6.18 with the above weight percentages (W5) in excess of 3 wt %. In addition, the batteries of Examples G6, and G6.12 to G6.16 attain greater improvement in the high temperature storability and cycle characteristics than those of Examples G6.10 and G6.11 with the above weight percentages (W5) less than 0.3 wt %.

Although Examples G6.10 to G6.18 cite the intermediate layers of complex hydroxide of nickel and manganese formed between the sintered nickel substrate and the active material, substantially the same results may be attained by the intermediate layer based on the complex hydroxide of nickel and at least one element selected from the group consisting of aluminum, iron, copper and silver or on the complex hydroxide of cobalt and at least one element selected from the group consisting of manganese, aluminum, iron, copper and silver.

EXAMPLES H1 TO H10

In Examples H1 to H10, the nickel hydroxide-based active material was loaded into the porous sintered nickel substrate the same way as in Examples A1 to A15.

Then, as shown in FIG. 2, the coating layer 3 based on the complex hydroxide of two elements was formed on the nickel hydroxide-based active material 2 loaded into the sintered nickel substrate 1.

Preparatory to the formation of coating layers of the complex hydroxide of two elements on the active material loaded into the sintered nickel substrate, there were prepared aqueous nitrate solutions which each contained nitrates of two elements in the weight ratio of 1:1 and in the combined weight percentage of 3 wt %. Specifically, there were used nitrates of yttrium and manganese in Example H1; nitrates of yttrium and aluminum in Example H2; nitrates of yttrium and iron in Example H3; nitrates of yttrium and copper in Example H4; nitrates of yttrium and silver in Example H5; nitrates of ytterbium and manganese in Example H6; nitrates of ytterbium and aluminum in Example H7; nitrates of ytterbium and iron in Example H8; nitrates of ytterbium and copper in Example H9; and nitrates of ytterbium and silver in Example H10.

The coating layer of complex hydroxide of two elements listed in Table 27 was formed on the active material loaded into the sintered nickel substrate by the steps of dipping the nickel substrate loaded with the active material into each of the above aqueous nitrate solutions, and dipping this substrate into the 25% NaOH aqueous solution at 80° C. Thus were fabricated nickel electrodes for alkaline secondary battery of these examples. The resultant coating layers of the above complex hydroxides on the active material substantially had a constant weight per unit area of 5 to 6 mg/cm$^2$. The coating layers each contained the complex hydroxide in concentrations of about 3 wt % based on the total weight of all the loaded materials of the coating layer and active material.

Alkaline secondary batteries of Examples H1 to H10 were fabricated using the respective nickel electrodes as the positive electrode therefor and the same procedure as in Examples A1 to A15.

COMPARATIVE EXAMPLE h1

Comparative example h1 employed the nickel electrode for alkaline secondary battery wherein only the nickel hydroxide-based active material was loaded into the porous sintered nickel substrate and the coating layer on the active material was dispensed with.

An alkaline secondary battery of Comparative Example h1 was fabricated using this nickel electrode as the positive electrode therefor and the same procedure as in Examples A1 to A15.

COMPARATIVE EXAMPLE h2

In Comparative Example h2, the coating layer of manganese hydroxide was formed on the active material by the steps of loading the nickel hydroxide-based active material into the sintered nickel substrate, dipping the nickel substrate into an aqueous solution of 3 wt % manganese nitrate, and dipping the substrate into the 25% NaOH aqueous solution at 80° C. Thus was fabricated a nickel electrode with the coating layer of manganese hydroxide. The resultant coating layer contained manganese hydroxide in concentrations of about 3 wt % based on the total weight of all the loaded materials of the coating layer and active material. The nickel electrode thus fabricated is equivalent to the nickel electrode for alkaline secondary battery disclosed in Japanese Unexamined Patent Publication No.5(1993)-121073.

An alkaline secondary battery of Comparative Example h2 was fabricated using the resultant nickel electrode as the positive electrode therefor and the same procedure as in Examples A1 to A15.

The alkaline secondary batteries of Examples H1 to H10 and Comparative Examples h1 and h2 were cycled at 25° C. through 10 cycles with 16 hr charge using a 100 mA charge current and discharge to a voltage of 1.0 V using a 200 mA discharge current.

Then, the alkaline secondary batteries cycled through 10 charge/discharge cycles at 25° C. were charged at the charge current of 100 mA for 16 hours. Subsequently, the batteries were discharged to 1.0 V at the high discharge current of 1000 mA so as to determine the battery voltage, as the working voltage, at midpoint of the period during which the voltage fell to the above cutoff voltage. The results are listed in Tables 27 as below.

The discharge capacity $Q_{10}$ at cycle 10 was determined for the respective alkaline secondary batteries cycled through 10 charge/discharge cycles at 25° C. The same alkaline secondary batteries were subjected to the 16 hr charge on the 11th cycle using the 100 mA charge current and then, to storage at 55° C. for two weeks. Subsequently, the batteries were placed under the temperature of 25° C. again and discharged to 1.0 V at 200 mA so as to determine the respective discharge capacities $Q_{11}$ at cycle 11. The high temperature storability was determined based on the following equation:

High-temperature storability(%)=$(Q_{11}/Q_{10}) \times 100$

The results are listed in Table 27 as below.

The batteries cycled through 10 charge/discharge cycles at 25° C. were further cycled with 0.8 hr charge using a 2000 mA charge current and discharge to 1.0 V using the 1000 mA discharge current, so as to determine a number of cycles until the discharge capacity of each battery fell to 80% of the discharge capacity $Q_{10}$ at cycle 10. The number of cycles thus determined is listed in Table 27 as the cycle characteristics.

The alkaline secondary batteries cycled through 10 charge/discharge cycles at 25° C. were charged at 100 mA for 16 hours under the temperature of 60° C. Subsequently, the batteries were placed under the temperature of 25° C. again and discharged to 1.0V using 200 mA discharge current, so as to determine the discharge capacity $Q'_{11}$ at cycle 11. The high temperature chargeability was determined based on the following equation:

High-temperature chargeability=$(Q'_{11}/Q_{10}) \times 100$

The results are listed in Table 27 as below.

TABLE 27

| | element of hydroxide in coating layer | working voltage (V) | high-temperature storability (%) | cycle characteristic (cycles) | high-temperature chargeability (%) |
|---|---|---|---|---|---|
| example H1 | Y + Mn | 1.218 | 75 | 900 | 90 |
| example H2 | Y + Al | 1.216 | 73 | 800 | 88 |
| example H3 | Y + Fe | 1.216 | 72 | 800 | 86 |
| example H4 | Y + Cu | 1.215 | 73 | 850 | 85 |
| example H5 | Y + Ag | 1.215 | 72 | 800 | 83 |
| example H6 | Yb + Mn | 1.217 | 73 | 880 | 88 |
| example H7 | Yb + Al | 1.215 | 71 | 780 | 86 |
| example H8 | Yb + Fe | 1.213 | 70 | 770 | 84 |
| example H9 | Yb + Cu | 1.213 | 71 | 840 | 83 |
| example H10 | Yb + Ag | 1.212 | 69 | 760 | 81 |
| comparative example h1 | — | 1.200 | 40 | 400 | 50 |
| comparative example h2 | Mn | 1.190 | 52 | 500 | 55 |

As apparent from this table, the alkaline secondary batteries of Examples H1 to H10, which include the coating layer laid on the surface portion of the nickel hydroxide-based active material and based on the complex hydroxide of one element selected from the group of yttrium and ytterbium and one element selected from the group of manganese, aluminum, iron, copper and silver, attain such great working voltages as to permit the high voltage discharge and notable improvement in the high temperature storability, cycle characteristics and high temperature chargeability as compared with that of Comparative Example h1 without the coating layer on the active material, and that of Comparative Example h2 with the coating layer of manganese hydroxide on the surface portion of the active material

EXAMPLES H1.1 TO H1.9

Similarly to Example H1, Examples H1.1 to H1.9 used the aqueous nitrate solution mixture containing yttrium nitrate and manganese nitrate in the weight ratio of 1:1 for forming coating layers of complex hydroxide of yttrium and manganese on the nickel hydroxide-based active material loaded into the sintered nickel substrate.

In these examples, the above aqueous nitrate solution was varied in the combined weight percentage (W7) of yttrium nitrate and manganese nitrate within the range of 0.1 to 7 wt % as listed in Table 28 as below, so as to form coating layers containing the complex hydroxide in weight percentages (W8) of 0.1 to 7 wt % based on the total weight of all the loaded materials of the coating layer and active material. Thus were fabricated nickel electrodes for alkaline secondary battery of these examples.

Alkaline secondary batteries of Examples H1.1 to H1.9 were fabricated using the respective nickel electrodes as the positive electrode therefor and the same procedure as in Examples A1 to A15.

Similarly to Examples H1 to H10 and Comparative examples h1 and h2, the working voltage, the high temperature storability, the cycle characteristics and the high temperature chargeability were determined for the respective alkaline secondary batteries of Examples H1.1 to H1.9. The results along with that of Example H1 are listed in Table 28 as below.

TABLE 28

| | W7 (wt %) | W8 (wt %) | working voltage (V) | high-temperature storability (%) | cycle characteristic (cycles) | high-temperature chargeability (%) |
|---|---|---|---|---|---|---|
| example H1.1 | 0.1 | 0.1 | 1.217 | 67 | 700 | 72 |
| example H1.2 | 0.3 | 0.3 | 1.217 | 70 | 800 | 80 |
| example H1.3 | 0.5 | 0.5 | 1.218 | 74 | 850 | 87 |

TABLE 28-continued

|  | W7 (wt %) | W8 (wt %) | working voltage (V) | high-temperature storability (%) | cycle characteristic (cycles) | high-temperature chargeability (%) |
|---|---|---|---|---|---|---|
| example H1.4 | 1 | 1 | 1.218 | 74 | 900 | 88 |
| example H1.5 | 2 | 2 | 1.218 | 74 | 900 | 89 |
| example H1 | 3 | 3 | 1.218 | 75 | 900 | 90 |
| example H1.6 | 4 | 4 | 1.217 | 75 | 900 | 91 |
| example H1.7 | 5 | 5 | 1.216 | 75 | 900 | 92 |
| example H1.8 | 6 | 6 | 1.213 | 75 | 850 | 92 |
| example H1.9 | 7 | 7 | 1.208 | 75 | 850 | 92 |

According to comparison among the alkaline secondary batteries of Examples H1, H1.1 to H1.9 with reference to this table, the batteries of Examples H1, and H1.3 to H1.7, which include the coating layers containing the complex hydroxide of yttrium and manganese in the weight percentages (W8) of 0.5 to 5 wt % based on the total weight of all the loaded materials of the coating layer and active material, attain greater working voltages permitting the high voltage discharge than those of Examples H1.8 and H1.9 with the above weight percentages (W8) in excess of 5 wt %. In addition, the batteries of Examples H1, and H1.3 to H1.7 attain greater improvement in the high temperature storability, cycle characteristics and high temperature chargeability than those of Examples H1.1 and H1.2 with the above weight percentages (W8) less than 0.5 wt %.

Although Examples H1.1 to H1.9 cite the coating layers of complex hydroxide of yttrium and manganese formed on the active material loaded into the sintered nickel substrate, substantially the same results may be attained by the coating layer based on the complex hydroxide of yttrium and at least one element selected from the group consisting of aluminum, iron, copper and silver or on the complex hydroxide of ytterbium and at least one element selected from the group consisting of manganese, aluminum, iron, copper and silver.

EXAMPLES H1.7.1 TO H1.7.13

Similarly to Example H1.7, Examples H1.7.1 to H1.7.13 used the aqueous nitrate solution mixture containing yttrium nitrate and manganese nitrate in the combined weight percentage (W7) of 5 wt % for forming coating layers of complex hydroxide of yttrium and manganese on the nickel hydroxide-based active material loaded into the sintered nickel substrate.

In these examples, the above aqueous nitrate solution was varied in the weight ratio (Y:Mn) between yttrium nitrate and manganese nitrate as shown in Table 29 as below, so as to form the coating layers on the active material. Thus were fabricated nickel electrodes for alkaline secondary battery of these examples. The weight percentage (W9) of manganese hydroxide in the coating layer and the weight percentage (W10) of yttrium hydroxide therein were determined for the respective nickel electrodes thus formed with the coating layers. The results along with that of Example H1.7 are listed in Table 29 as below.

TABLE 29

|  | weight percentage in aqueous nitrate solution Y:Mn | W9 (wt %) | W10 (wt %) |
|---|---|---|---|
| example H1.7.1 | 9.8:0.2 | 0.1 | 4.9 |
| example H1.7.2 | 9.6:0.4 | 0.2 | 4.8 |
| example H1.7.3 | 9.4:0.6 | 0.3 | 4.7 |
| example H1.7.4 | 8:2 | 1.0 | 4.0 |
| example H1.7.5 | 7:3 | 1.5 | 3.5 |
| example H1.7.6 | 6:4 | 2.0 | 3.0 |
| example H1.7 | 1:1 | 2.5 | 2.5 |
| example H1.7.7 | 4:6 | 3.0 | 2.0 |
| example H1.7.8 | 3.6:6.4 | 3.2 | 1.8 |
| example H1.7.9 | 3.2:6.8 | 3.4 | 1.6 |
| example H1.7.10 | 2:8 | 4.0 | 1.0 |
| example H1.7.11 | 0.6:9.4 | 4.7 | 0.3 |
| example H1.7.12 | 0.4:9.6 | 4.8 | 0.2 |
| example H1.7.13 | 0.2:9.8 | 4.9 | 0.1 |

Alkaline secondary batteries of Examples H1.7.1 to H7.1.13 were fabricated using the respective nickel electrodes as the positive electrode therefor and the same procedure as in Examples A1 to a15.

Similarly to Examples H1 to H10 and Comparative examples h1 and h2, the working voltage, the high temperature storability, the cycle characteristics and the high temperature chargeability were determined for the respective alkaline secondary batteries of Examples H1.7.1 to H1.7.13. The results along with that of Example H1.7 are listed in Table 30 as below.

TABLE 30

|  | working voltage (V) | high-temperature storability (%) | cycle characteristic (cycles) | high-temperature chargeability (%) |
|---|---|---|---|---|
| example H1.7.1 | 1.218 | 65 | 730 | 92 |
| example H1.7.2 | 1.218 | 67 | 780 | 92 |
| example H1.7.3 | 1.218 | 69 | 820 | 92 |
| example H1.7.4 | 1.218 | 71 | 850 | 92 |
| example H1.7.5 | 1.217 | 73 | 880 | 92 |
| example H1.7.6 | 1.217 | 74 | 900 | 92 |
| example H1.7 | 1.216 | 75 | 900 | 92 |
| example H1.7.7 | 1.215 | 76 | 900 | 91 |
| example H1.7.8 | 1.210 | 76 | 900 | 90 |
| example H1.7.9 | 1.209 | 76 | 900 | 88 |
| example H1.7.10 | 1.207 | 76 | 900 | 87 |
| example H1.7.11 | 1.206 | 76 | 900 | 85 |
| example H1.7.12 | 1.205 | 76 | 900 | 80 |
| example H1.7.13 | 1.204 | 76 | 900 | 74 |

According to comparison among the alkaline secondary batteries of Examples H1.7, H1.7.1 to H1.7.13 with reference to this table, the batteries of Examples H1.7, and H1.7.3 to H1.7.7, which include the coating layers containing manganese hydroxide in the weight percentages (W9) of 0.3 to 3 wt % based on the total weight of all the loaded materials of the coating layer and active material, attain greater working voltages permitting the high voltage discharge and greater high temperature chargeability than those of Examples H1.7.8 to H1.7.13 with the above weight percentages (W9) in excess of 3 wt %. In addition, the batteries of Examples H1.7, and H1.7.3 to H1.7.7 attain greater improvement in the high temperature storability and cycle characteristics than those of Examples H1.7.1 and H1.7.2 with the above weight percentages (W9) less than 0.3 wt %.

The batteries of Examples H1.7, and H1.7.6 to H1.7.11, which include the coating layers containing yttrium hydroxide in the weight percentages (W10) of 0.3 to 3 wt % based on the total weight of all the loaded materials of the coating layer and active material, attain greater high temperature storability and cycle characteristics than those of Examples H1.7.1 to H1.7.5 with the above weight percentages (W10) in excess of 3 wt %. Further, the batteries of Examples H1.7, and H1.7.6 to H1.7.11 attain greater working voltages permitting the high voltage discharge and greater high temperature chargeability than those of Examples H1.7.12 and H1.7.13 with the above weight percentages (W10) less than 0.3 wt %.

Particularly favorable results with great working voltage as well as excellent high temperature storability, cycle characteristics and high temperature chargeability are achieved by the batteries of Examples H1.7, H1.7.6 and H1.7.7 which have the respective weight percentages of manganese hydroxide and yttrium hydroxide in the range of 2 to 3 wt % based on the total weight of all the loaded materials of the active material and coating layer.

Although Examples H1.7.1 to H1.7.13 cite the coating layers of complex hydroxide of yttrium and manganese formed on the active material loaded into the sintered nickel substrate, substantially the same results may be attained by the coating layer based on the complex hydroxide of yttrium and at least one element selected from the group consisting of aluminum, iron, copper and silver or on the complex hydroxide of ytterbium and at least one element selected from the group consisting of manganese, aluminum, iron, copper and silver.

EXAMPLES I1 TO I20

In Examples I1 to I20, the nickel hydroxide-based active material was loaded into the porous sintered nickel substrate the same way as in Examples A1 to A15.

Then, as shown in FIG. 2, the coating layer 3 based on the complex hydroxide of three elements was formed on the nickel hydroxide-based active material 2 loaded into the sintered nickel substrate 1.

Preparatory to the formation of the coating layer of the complex hydroxide of three elements on the active material loaded into the sintered nickel substrate, there were prepared aqueous nitrate solutions which each contained nitrates of three elements in the weight ratio of 1:1:1 and in the combined weight percentage of 3 wt %. Specifically, there were used nitrates of cobalt, yttrium and manganese in Example I1; nitrates of cobalt, yttrium and aluminum in Example I2; nitrates of cobalt, yttrium and iron in Example I3; nitrates of cobalt, yttrium and copper in Example I4; nitrates of cobalt, yttrium and silver in Example I5; nitrates of cobalt, ytterbium and manganese in Example I6; nitrates of cobalt, ytterbium and aluminum in Example I7; nitrates of cobalt, ytterbium and iron in Example I8; nitrates of cobalt, ytterbium and silver in Example I9; nitrates of cobalt, ytterbium and silver in Example I10; nitrates of nickel, yttrium and manganese in Example I11; nitrates of nickel, yttrium and aluminum in Example I12; nitrates of nickel, yttrium and iron in Example I13; nitrates of nickel, yttrium and copper in Example I14; nitrates of nickel, yttrium and silver in Example I15; nitrates of nickel, ytterbium and manganese in Example I16; nitrates of nickel, ytterbium and aluminum in Example I17; nitrates of nickel, ytterbium and iron in Example I18; nitrates of nickel, ytterbium and copper in Example I19; and nitrates of nickel, ytterbium and silver in Example I20.

The coating layer of complex hydroxide of three elements listed in Table 31 was formed on the active material loaded into the sintered nickel substrate by the steps of dipping the nickel substrate loaded with the active material into each of the above aqueous nitrate solutions, and dipping this substrate into the 25% NaOH aqueous solution at 80° C. Thus were fabricated nickel electrodes for alkaline secondary battery of these examples. The resultant coating layers of the above complex hydroxides on the active material substantially had a constant weight per unit area of 5 to 6 mg/cm$^2$. The coating layers each contained the complex hydroxide in concentrations of about 3 wt % based on the total weight of all the loaded materials of the coating layer and active material.

Alkaline secondary batteries of Examples I1 to I20 were fabricated using the respective nickel electrodes as the positive electrode therefor and the same procedure as in Examples A1 to A15.

Similarly to Examples H1 to H10 and Comparative examples h1 and h2, the working voltage, the high temperature storability, the cycle characteristics and the high temperature chargeability were determined for the respective alkaline secondary batteries of Examples I1 to I120. The results are listed in Table 31 as below.

TABLE 31

|  | element of hydroxide in coating layer | working voltage (V) | high-temperature storability (%) | cycle characteristic (cycles) | high-temperature chargeability (%) |
| --- | --- | --- | --- | --- | --- |
| example I1 | Co + Y + Mn | 1.219 | 72 | 940 | 87 |
| example I2 | Co + Y + Al | 1.217 | 69 | 840 | 86 |
| example I3 | Co + Y + Fe | 1.217 | 69 | 840 | 83 |
| example I4 | Co + Y + Cu | 1.216 | 68 | 880 | 81 |
| example I5 | Co + Y + Ag | 1.216 | 69 | 830 | 78 |
| example I6 | Co + Yb + Mn | 1.218 | 70 | 920 | 85 |
| example I7 | Co + Yb + Al | 1.215 | 68 | 820 | 83 |

TABLE 31-continued

|  | element of hydroxide in coating layer | working voltage (V) | high-temperature storability (%) | cycle characteristic (cycles) | high-temperature chargeability (%) |
|---|---|---|---|---|---|
| example I8 | Co + Yb + Fe | 1.213 | 67 | 810 | 80 |
| example I9 | Co + Yb + Cu | 1.214 | 68 | 870 | 78 |
| example I10 | Co + Yb + Ag | 1.213 | 66 | 790 | 77 |
| example I11 | Ni + Y + Mn | 1.220 | 73 | 950 | 88 |
| example I12 | Ni + Y + Al | 1.218 | 71 | 850 | 86 |
| example I13 | Ni + Y + Fe | 1.218 | 70 | 850 | 84 |
| example I14 | Ni + Y + Cu | 1.217 | 70 | 850 | 83 |
| example I15 | Ni + Y + Ag | 1.217 | 70 | 900 | 80 |
| example I16 | Ni + Yb + Mn | 1.219 | 71 | 850 | 86 |
| example I17 | Ni + Yb + Al | 1.217 | 69 | 930 | 84 |
| example I18 | Ni + Yb + Fe | 1.215 | 68 | 830 | 82 |
| example I19 | Ni + Yb + Cu | 1.215 | 69 | 890 | 80 |
| example I20 | Ni + Yb + Ag | 1.214 | 67 | 810 | 79 |

As apparent from this table, the alkaline secondary batteries of Examples I1 to I20, wherein the coating layer of complex hydroxide of one element selected from the group of cobalt and nickel, one element selected from the group of yttrium and ytterbium, and one element selected from the group of manganese, aluminum, iron, copper and silver, is formed on the active material loaded into the sintered nickel substrate, attain greater working voltages permitting the high voltage discharge and much greater improvement in the high temperature storability, cycle characteristics and high temperature chargeability than those of Comparative Examples h1 and h2.

EXAMPLES I11.1 TO I11.9

Similarly to Example I11, Examples I11.1 to I11.9 used the aqueous nitrate solution mixture containing nickel nitrate, yttrium nitrate and manganese nitrate in the weight ratio of 1:1:1 for forming coating layers of complex hydroxide of nickel, yttrium and manganese on the nickel hydroxide-based active material loaded into the sintered nickel substrate.

In these examples, the above aqueous nitrate solution was varied in the combined weight percentage (W11) of nitrates of nickel, yttrium and manganese within the range of 0.1 to 7 wt % as listed in Table 32 as below, so as to form the coating layers containing the complex hydroxide in weight percentages (W12) of 0.1 to 7 wt % based on the total weight of all the loaded materials of the coating layer and active material, as listed in the table. Thus were fabricated nickel electrodes for alkaline secondary battery of these examples.

Alkaline secondary batteries of Examples I11.1 to I11.9 were fabricated using the respective nickel electrodes as the positive electrode therefor and the same procedure as in Examples A1 to A15.

Similarly to Examples H1 to H10 and Comparative examples h1 and h2, the working voltage, the high temperature storability, the cycle characteristics and the high temperature chargeability were determined for the respective alkaline secondary batteries of Examples I11.1 to I11.9. The results along with that of Example I11 are listed in Table 32 as below.

TABLE 32

|  | W11 (wt %) | W12 (wt %) | working voltage (V) | high-temperature storability (%) | cycle characteristic (cycles) | high-temperature chargeability (%) |
|---|---|---|---|---|---|---|
| example I11.1 | 0.1 | 0.1 | 1.219 | 65 | 750 | 69 |
| example I11.2 | 0.3 | 0.3 | 1.219 | 68 | 850 | 78 |
| example I11.3 | 0.5 | 0.5 | 1.220 | 72 | 900 | 85 |
| example I11.4 | 1 | 1 | 1.220 | 72 | 950 | 86 |
| example I11.5 | 2 | 2 | 1.220 | 72 | 950 | 87 |
| example I11 | 3 | 3 | 1.220 | 73 | 950 | 88 |
| example I11.6 | 4 | 4 | 1.219 | 73 | 950 | 89 |
| example I11.7 | 5 | 5 | 1.218 | 73 | 950 | 90 |
| example I11.8 | 6 | 6 | 1.215 | 73 | 900 | 90 |
| example I11.9 | 7 | 7 | 1.210 | 73 | 900 | 90 |

According to comparison among the alkaline secondary batteries of Examples I11, I11.1 to I11.9 with reference to this table, the batteries of Examples I11, and I11.3 to I11.7, which include the coating layers containing the complex hydroxide of nickel, yttrium and manganese in the weight percentages (W12) of 0.5 to 5 wt % based on the total weight of all the loaded materials of the coating layer and active material, attain greater working voltages permitting the high voltage discharge than those of Examples I11.8 and I11.9 with the above weight percentages (W12) in excess of 5 wt %. In addition, the batteries of Examples I11, and I11.3 to I11.7 attain greater improvement in the high temperature storability, cycle characteristics and high temperature chargeability than those of Examples I11.1 and I11.2 with the above weight percentages (W12) less than 0.5 wt %.

Although Examples I11.1 to I11.9 cite the coating layers of complex hydroxide of nickel, yttrium and manganese formed on the active material loaded into the sintered nickel substrate, substantially the same results may be attained by the coating layer based on the complex hydroxide of yttrium, cobalt and at least one element selected from the group consisting of aluminum, iron, copper and silver or on the complex hydroxide of ytterbium, at least one element selected from the group of cobalt and nickel, and at least one element selected from the group consisting of manganese, aluminum, iron, copper and silver.

EXAMPLES I11.7.1. TO I11.7.13

Similarly to Example I11.7, Examples I11.7.1 to I11.7.13 used the aqueous nitrate solution mixture containing nickel nitrate, yttrium nitrate and manganese nitrate in the combined weight percentage (W11) of 5 wt % for forming coating layers of complex hydroxide of nickel, yttrium and manganese on the nickel hydroxide-based active material loaded into the sintered nickel substrate.

In these examples, the above aqueous nitrate solution was varied in the weight ratio (Ni:Y:Mn) among nickel nitrate, yttrium nitrate and manganese nitrate as listed in Table 33 as below, so as to form the coating layers. Thus were fabricated nickel electrodes for alkaline secondary battery of these examples. The weight percentage (W13) of manganese hydroxide in the coating layer and the weight percentage (W14) of yttrium hydroxide therein were determined for the respective nickel electrodes thus formed with the coating layers. The results are also listed in Table 33 as below.

TABLE 33

| | weight percentage in aqueous nitrate solution Ni:Y:Mn | W13 (wt %) | W14 (wt %) |
|---|---|---|---|
| example I11.7.1 | 2.0:7.8:0.2 | 0.1 | 3.9 |
| example I11.7.2 | 2.0:7.6:0.4 | 0.2 | 3.8 |
| example I11.7.3 | 2.0:7.4:0.6 | 0.3 | 3.7 |
| example I11.7.4 | 2.0:6.0:2.0 | 1.0 | 3.0 |
| example I11.7.5 | 2.0:5.0:3.0 | 1.5 | 2.5 |
| example I11.7.6 | 2.0:4.0:4.0 | 2.0 | 2.0 |
| example I11.7.7 | 2.0:3.0:5.0 | 2.5 | 1.5 |
| example I11.7.8 | 2.0:2.0:6.0 | 3.0 | 1.0 |
| example I11.7.9 | 2.0:1.6:6.4 | 3.2 | 0.8 |
| example I11.7.10 | 2.0:1.2:6.8 | 3.4 | 0.6 |
| example I11.7.11 | 2.0:0.6:7.4 | 3.7 | 0.3 |
| example I11.7.12 | 2.0:0.4:7.6 | 3.8 | 0.2 |
| example I11.7.13 | 2.0:0.2:7.8 | 3.9 | 0.1 |

Alkaline secondary batteries of Examples I11.7.1 to I11.7.13 were fabricated using the respective nickel electrodes as the positive electrode therefor and the same procedure as in Examples A1 to A15.

Similarly to Examples H1 to H10 and Comparative examples h1 and h2, the working voltage, the high temperature storability, the cycle characteristics and the high temperature chargeability were determined for the respective alkaline secondary batteries of Examples I11.7.1 to I11.7.13.

The results are listed in Table 34 as below.

TABLE 34

| | working voltage (V) | high-temperature storability (%) | cycle characteristic (cycles) | high-temperature chargeability (%) |
|---|---|---|---|---|
| example I11.7.1 | 1.220 | 68 | 770 | 86 |
| example I11.7.2 | 1.220 | 71 | 840 | 86 |
| example I11.7.3 | 1.220 | 73 | 900 | 86 |
| example I11.7.4 | 1.219 | 74 | 940 | 86 |
| example I11.7.5 | 1.219 | 74 | 950 | 86 |
| example I11.7.6 | 1.218 | 75 | 950 | 86 |
| example I11.7.7 | 1.217 | 76 | 950 | 85 |
| example I11.7.8 | 1.215 | 76 | 950 | 84 |
| example I11.7.9 | 1.210 | 76 | 950 | 83 |
| example I11.7.10 | 1.208 | 76 | 950 | 82 |
| example I11.7.11 | 1.206 | 76 | 950 | 81 |
| example I11.7.12 | 1.205 | 76 | 950 | 75 |
| example I11.7.13 | 1.204 | 76 | 950 | 68 |

According to comparison among the alkaline secondary batteries of Examples I11.7.1 to I11.7.13 with reference to this table, the batteries of Examples I11.7.3 to I11.7.8, which include the coating layers containing manganese hydroxide in the weight percentages (W13) of 0.3 to 3 wt % based on the total weight of all the loaded materials of the coating layer and active material, attain greater working voltages permitting the high voltage discharge and greater high temperature chargeability than those of Examples I11.7.9 to I11.7.13 with the above weight percentages (W13) in excess of 3 wt %. In addition, the batteries of Examples I11.7.3 to I11.7.8 attain greater improvement in the high temperature storability and cycle characteristics than those of Examples I11.7.1 and I11.7.2 with the above weight percentages (W13) less than 0.3 wt %.

The batteries of Examples I11.7.4 to I11.7.11 with the coating layers containing yttrium hydroxide in the weight percentages (W14) of 0.3 to 3 wt % based on the total weight of all the loaded materials of the coating layer and active material, attain greater improvement in the high temperature storability and cycle characteristics than those of Examples I11.7.1 to I11.7.3 with the above weight percentages (W14) in excess of 3 wt %. Further, the batteries of Examples I11.7.4 to I11.7.11 attain greater working voltages permitting the high voltage discharge and greater high temperature chargeability than those of Examples I11.7.12 and I11.7.13 with the above weight percentages (W14) less than 0.3 wt %.

Although Examples I11.7.1 to I11.7.13 cite the coating layers of complex hydroxide of nickel, yttrium and manganese formed on the active material loaded into the sintered nickel substrate, substantially the same results may be attained by the coating layer based on the complex hydroxide of yttrium, cobalt and at least one element selected from the group consisting of aluminum, iron, copper and silver or on the complex hydroxide of ytterbium, at least one element selected from the group of cobalt and nickel, and at least one element selected from the group consisting of manganese, aluminum, iron, copper and silver.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A sintered nickel electrode, which employs a porous sintered nickel substrate obtained by sintering and is fabricated by chemically impregnating the porous sintered nickel substrate with a salt as an active material, for alkaline secondary battery including the following:

a porous sintered nickel substrate;

a nickel hydroxide-based active material layer provided on the above-mentioned porous sintered nickel substrate; and a first layer which is provided on the above-mentioned active material layer and is based on a complex compound of nickel and at least one element selected from the group consisting of cobalt, calcium, strontium, scandium, yttrium, lanthanide, bismuth, magnesium and barium.

2. The nickel electrode for alkaline secondary battery as claimed in claim 1, wherein the lanthanide in said layer is comprised of at least one element selected from the group consisting of lanthanum, cerium, praseodymium, neodymium, europium and ytterbium.

3. The nickel electrode for alkaline secondary battery as claimed in claim 1, wherein the complex compound in said layer is comprised of a hydroxide, an oxide, or a mixture thereof.

4. The nickel electrode for alkaline secondary battery as claimed in claim 1, wherein said first layer contains the complex compound in weight percentage of 0.5 to 5 wt % based on the total weight of said active material layer.

5. The nickel electrode for alkaline secondary battery as claimed in claim 1, wherein said first layer contains the compound of the element(s) selected from the group consisting of cobalt, calcium, strontium, scandium, yttrium, lanthanide, bismuth, magnesium and barium in a total weight percentage of 0.3 to 3 wt %. based on the total weight of said active material layer and said layer.

6. An alkaline secondary battery employing the nickel electrode for alkaline secondary battery of claim 1 as a positive electrode.

7. A sintered nickel electrode, which employs a porous sintered nickel substrate obtained by sintering and is fabricated by chemically impregnating the porous sintered nickel substrate with a salt as an active material, for alkaline secondary battery including the following:

a porous sintered nickel substrate;

a first layer which is provided on the above-mentioned porous sintered nickel substrate and is based on a complex compound of nickel and at least one element selected from the group consisting of cobalt, calcium, strontium, scandium, yttrium, lanthanide, bismuth, magnesium and barium; and a hydroxide nickel-based active material layer provided on the above-mentioned layer.

8. The nickel electrode for alkaline secondary battery as claimed in claim 7, wherein the lanthanide in said layer is comprised of at least one element selected from the group consisting of lanthanum, cerium, praseodymium, neodymium, europium and ytterbium.

9. The nickel electrode for alkaline secondary battery as claimed in claim 7, wherein the complex compound in said layer is comprised of a hydroxide, an oxide, or a mixture thereof.

10. The nickel electrode for alkaline secondary battery as claimed in claim 7, wherein said first layer contains the complex compound in weight percentage of 0.5 to 5 wt % based on the total weight of said active material layer and said layer.

11. The nickel electrode for alkaline secondary battery as claimed in claim 7, wherein said first layer contains the compound of the element(s) selected from the group consisting of cobalt, calcium, strontium, scandium, yttrium, lanthanide, bismuth, magnesium and barium in a total weight percentage of 0.3 to 3 wt % based on the total weight of said active material layer and said layer.

12. An alkaline secondary battery employing the nickel electrode for alkaline secondary battery of claim 7 as a positive electrode.

13. A nickel electrode for alkaline secondary battery including the following:

a porous sintered nickel substrate;

a first layer which is provided on the above-mentioned porous sintered nickel substrate and is based on a complex compound of nickel and at least one element selected from the group consisting of cobalt, calcium, strontium, scandium, yttrium, lanthanide, bismuth, magnesium and barium;

a nickel hydroxide-based active material layer provided on the above-mentioned first layer; and a second layer which is provided on the above-mentioned active material layer and is based on a complex compound of nickel and at least one element selected from the group consisting of cobalt, calcium, strontium, scandium, yttrium, lanthanide, bismuth, magnesium, and barium.

14. The sintered nickel electrode, which employs a porous sintered nickel substrate obtained by sintering and is fabricated by chemically impregnating the porous sintered nickel substrate with a salt as an active material, for alkaline secondary battery as claimed in claim 13, wherein the lanthanide in said first or second layer is comprised of at least one element selected from the group consisting of lanthanum, cerium, praseodymium, neodymium, europium and ytterbium.

15. The nickel electrode for alkaline secondary battery as claimed in claim 13, wherein the complex compound in said first or second layer is comprised of a hydroxide, an oxide, or a mixture thereof.

16. The nickel electrode for alkaline secondary battery as claimed in claim 13, wherein said first and second layers contain the complex compound in weight percentage of 0.5 to 5 wt % based on the total weight of said active material layer, and first and second layers.

17. The nickel electrode for alkaline secondary battery as claimed in claim 13, wherein said first and second layers contain the compound of the element(s) selected from the group consisting of cobalt, calcium, strontium, scandium, yttrium, lanthanide, bismuth, magnesium and barium in a total weight percentage of 0.3 to 3 wt % based on the total weight of said active material layer, and first and second layers.

18. An alkaline secondary battery employing the nickel electrode for alkaline secondary battery of claim 13 as a positive electrode.

* * * * *